US007260090B2

(12) United States Patent
Buswell et al.

(10) Patent No.: US 7,260,090 B2
(45) Date of Patent: Aug. 21, 2007

(54) ANALOG GATEWAY

(75) Inventors: Theodore Albert Buswell, Winter Harbor, ME (US); Frank Curatola, River Edge, NJ (US); Aruchunan Vaseekaran, Guttenberg, NJ (US)

(73) Assignee: Ontash & Ermac, Inc., River Edge, NJ (US)

( * ) Notice: Subject to any disclaimer, the term of this patent is extended or adjusted under 35 U.S.C. 154(b) by 943 days.

(21) Appl. No.: 10/133,949

(22) Filed: Apr. 26, 2002

(65) Prior Publication Data
US 2003/0202523 A1 Oct. 30, 2003

(51) Int. Cl.
*H04L 12/66* (2006.01)
*H04L 12/28* (2006.01)
*H04J 3/16* (2006.01)

(52) U.S. Cl. .................. 370/356; 370/395.64; 370/401; 370/466; 709/246; 725/119

(58) Field of Classification Search ..................... None
See application file for complete search history.

(56) References Cited

U.S. PATENT DOCUMENTS

| | | | |
|---|---|---|---|
| 5,508,732 A * | 4/1996 | Bottomley et al. ........... 725/93 |
| 5,657,390 A | 8/1997 | Elgamal et al. | |
| 6,097,723 A | 8/2000 | Fielding et al. | |
| 6,272,127 B1 * | 8/2001 | Golden et al. .............. 370/352 |
| 6,281,790 B1 | 8/2001 | Kimmel et al. | |
| 6,323,897 B1 | 11/2001 | Kogane et al. | |
| 6,678,740 B1 * | 1/2004 | Rakib et al. ................. 709/247 |
| 6,721,306 B1 * | 4/2004 | Farris et al. ................. 370/352 |
| 6,816,904 B1 * | 11/2004 | Ludwig et al. ............. 709/226 |
| 6,889,385 B1 * | 5/2005 | Rakib et al. ................. 725/119 |
| 2001/0039437 A1 | 11/2001 | Taepke, II et al. | |

FOREIGN PATENT DOCUMENTS

WO    WO 01/78297 A2    10/2001

* cited by examiner

*Primary Examiner*—Chi Pham
*Assistant Examiner*—Melanie Jagannathan
(74) *Attorney, Agent, or Firm*—Katten Muchin Rosenman LLP; John S. Paniaguas

(57) ABSTRACT

A secure analog gateway is configured with a pipelined architecture for interfacing various types of analog devices with a digital communication network and enabling asynchronous bi-directional communication between the analog device and the digital communication network using, for example, standard transmission control protocol over internet protocol (TCP/IP) in a network mode of operation. The analog gateway is also capable of operation in a stand-alone mode of operation in which data from an analog device is stored locally for later retrieval by way of a network. The functionality of the analog gateway is segregated among multiple processing elements which each perform a specific part of the gateway's function. In accordance with an important aspect of the invention, the analog gateway utilizes relatively inexpensive digital signal processors (DSP) to perform gateway functions, thus eliminating the need for relatively more expensive microprocessors and increased memory storage for storing Microsoft Windows or Unix operating systems and web-browsers as in known systems. In one embodiment of the invention, the analog gateway is configured to provide secure communications using standard TCP/IP over the world-wide web.

19 Claims, 33 Drawing Sheets

ANALOG GATEWAY

BACKGROUND OF THE INVENTION

1. Field of the Invention

The present invention relates to an analog gateway and more particularly to an analog gateway, which can be used externally or embedded with one of various analog devices, for interfacing an analog device with a local persistent storage device in a stand alone mode of operation, and, in a network mode of operation, enabling bi-directional communication between the analog device and one or more workstations over a digital communication network using standard communication protocols, the analog gateway configured with a pipelined architecture which allows the cost of the device to be greatly reduced.

2. Description of the Prior Art

Various communication systems are known for transmission of analog signals over networks. Probably the most commonly known is the plain old telephone system (POTS). Both voice and data transmissions are known to be transmitted using POTS. Unfortunately, POTS requires a dedicated phone line and can be quite expensive depending on whether long distance charges apply. Accordingly, there has been a trend to utilize public digital communications networks, such as the World Wide Web and the Internet. Examples of such systems are disclosed in U.S. Pat. Nos. 6,092,078 and 6,281,790 and published international application disclosed in U.S. Pat. Nos. 6,092,078 and 6,281,790 and published international application WO 01/78297 A2. Such systems are used in connection with analog monitoring devices, for example, for use in healthcare and home security systems to transfer data over the Internet but have various drawbacks.

More particularly, U.S. Pat. No. 6,281,790 discloses a home security system in which various types of home security monitors are connected to a security panel. The security panel includes a microprocessor; sufficient memory to run an operating system; and an embedded web server. Communication between the various sensors and the security panel is by way of an RS 485 port. Accordingly, the sensors connected to the security panel are restricted to two operating states. Not only is the system restricted to sensors with binary outputs, but also requires a relatively expensive microprocessor and sufficient memory storage to run an operating system, such as a Microsoft Windows or UNIX type operating systems.

U.S. Pat. No. 6,092,078 describes a system for monitoring data from various sensors by way of a web-browser. The system accordingly requires a relatively expensive microprocessor and sufficient memory to run a UNIX type operating system as well as a web-browser.

Published international application WO 01/78297 A2 discloses an interface device for use in converting analog signals to digital signals and transmitting the digital signals over a digital communication network. Unlike the systems disclosed in U.S. Pat. Nos. 6,092,078 and 6,281,790, the system disclosed in the published international application does not require an expensive microprocessor; a Microsoft Windows or Unix type operating system; or a web-browser. Rather the system disclosed in the published international application uses a relatively simple inexpensive digital signal processor (DSP) for processing analog signals for transmission over a digital network. The system includes a coder-decoder (CODEC) which includes an analog to digital converter as well as a digital to analog converter for signal conversion to enable bi-directional communication with analog devices connected to a digital network. The CODEC utilizes a pair of relatively inexpensive digital signal processors and a control processor. The system disclosed in the published international application is for use in a synchronous communication network and thus requires generation of the local clock signal and thus requires a local oscillator which increases the costs of the system and prevents it from interfacing with TCP/IP networks such as the Internet without the use of a separately supplied protocol converter box.

Accordingly, there is a need for an analog gateway for interfacing various analog devices with a public communication network in an asynchronous manner while at the same time eliminating the need for Microsoft Windows or UNIX type operating systems.

SUMMARY OF THE INVENTION

The present invention relates to an analog gateway configured with a pipelined architecture for interfacing various types of analog devices with a digital communication network and enabling asynchronous bi-directional communication between the analog device and the digital communication network using, for example, standard transmission control protocol over internet protocol (TCP/IP) in a network mode of operation. The analog gateway is also capable of operation in a stand-alone mode of operation in which data from an analog device is stored locally for later retrieval by way of a network. The functionality of the analog gateway is segregated among multiple processing elements which each perform a specific part of the gateway's function. In accordance with an important aspect of the invention, the analog gateway utilizes relatively inexpensive digital signal processors (DSP) to perform gateway functions, thus eliminating the need for relatively more expensive microprocessors and increased memory storage for storing Microsoft Windows or Unix operating systems and web-browsers as in known systems. In one embodiment of the invention, the analog gateway is configured to provide secure communications using standard TCP/IP protocol over the world-wide web.

DETAILED DESCRIPTION

The present invention relates to an analog gateway for enabling bi-directional communication between one or more analog devices connected to the gateway and a digital communication network, for example, utilizing standard protocol, such as TCP/IP. The analog gateway is configured with a pipelined architecture which includes multiple processing elements, each of which performs one or more specific tasks which are passed on to the next stage of the pipeline. Each processing element's program and executive is limited to that which is specifically required for the task it performs. While this removes the ability to use off-the-shelf operating systems, such as Unix or Windows, it provides a higher level of performance and less memory space.

Figure 2:
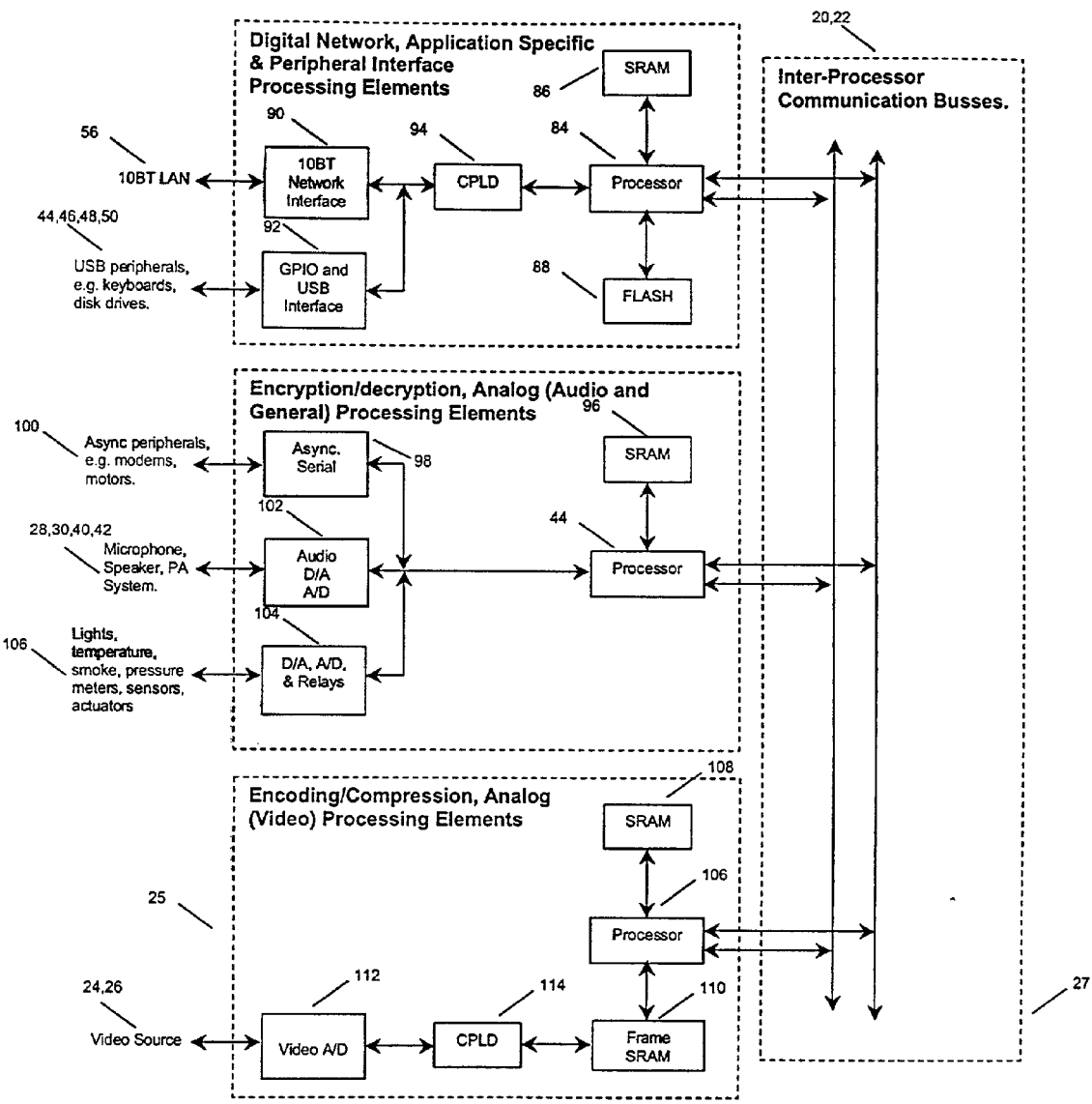
FIG. 2 is a block diagram of an exemplary configuration of an analog gateway in accordance with the present invention, illustrating the pipelined architecture of the various processing elements.

An exemplary embodiment of an analog gateway in accordance with the present invention is shown in FIG. 2 and generally identified with the reference numerals 20, 22. The analog gateway 20, 22 includes multiple processing elements, for example, first, second and third processing elements 21, 23 and 25. The first, second and third processing elements 21, 23 and 25 are arranged in a pipelined architecture and configured to be in communication with each other by way of one or more inter-processor busses 27, for example, a high speed synchronous serial bus.

The first processing element 21, for example, may be configured to handle tasks related to the digital network, such as transmitting and receiving digital data over a digital communications network using standard protocol, such as TCP/IP. The first processing element 21 may also be tasked with interfacing with digital peripherals, such as various USB peripherals, for example, keyboards and local storage devices. Finally, in the example illustrated, the first processing element 21 may also be tasked with application specific processing, such as identifying objects in video frames.

The second processing element 23 may be for audio and general analog signal processing. In addition, in embodiments in which transmissions over the digital communication network are secure, the second processing element 23 may be tasked with the encryption/decryption responsibility. For example, the data may be secured using a combination of so called public key and private key cryptographic systems. In one embodiment of the invention, the key exchange and encryption may be performed according to the Transport Layer Security (TLS) specification: "The TLS" protocol version 1.0, January 1999, pages 1-39 (HTTP://www.ietf.org/rfc/2246.txt).

The third processing element 25 may be used for processing video data, for example, from video cameras. More specifically, the third processing element 25 may be configured to digitize analog video signals as well as encode the digitized video signal into a suitable format and compress the digitized video signal for transmission over the digital communication network.

Figure 11:
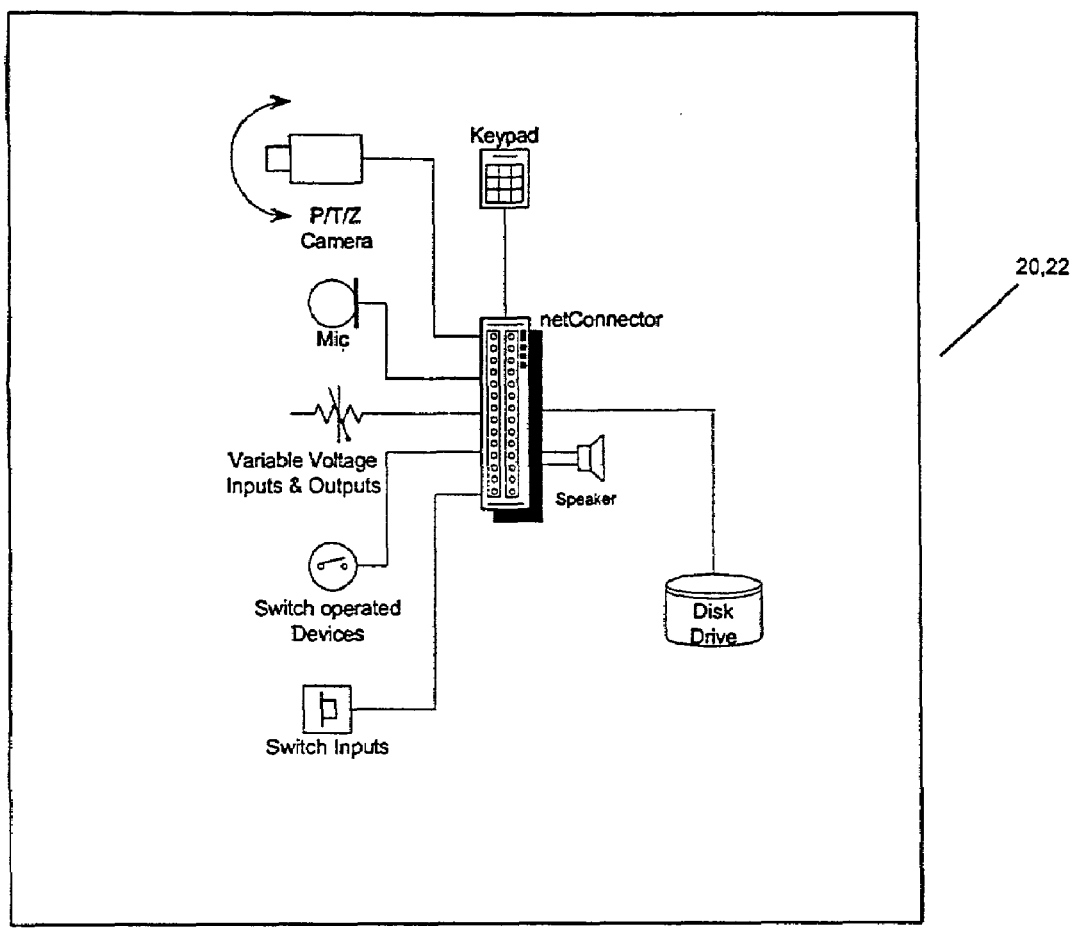
FIG. 11 is a block diagram of the analog gateway in accordance with the present invention, illustrating standalone operation.

The analog gateway 20, 22 is configured with two or more modes of operations; for example, a network mode and a stand alone mode. In a network mode, communication between the analog gateway 20, 22 and a workstation follows the well-known client server model. In particular, application software executing on the analog gateway 20, 22 acts as the server while application software executing on the workstation acts as the client. The application's specific protocol for communicating messages between the client and the server may be based upon the hypertext transfer protocol (HTTP), for example, as defined in Hypertext Transfer Protocol—http/1.1, June 1999, pages 1-35, (HTTP:/www.ietf.org/rfc/rfc2626.txt). In the standalone mode of operation, the analog gateway 20, 22 may be used in a condition in which it is not connected to a digital communication network as illustrated in FIG. 11. In such a mode of operation, analog data from various analog sensors is stored in a persistent storage device, such as a disk drive.

Figure 1:
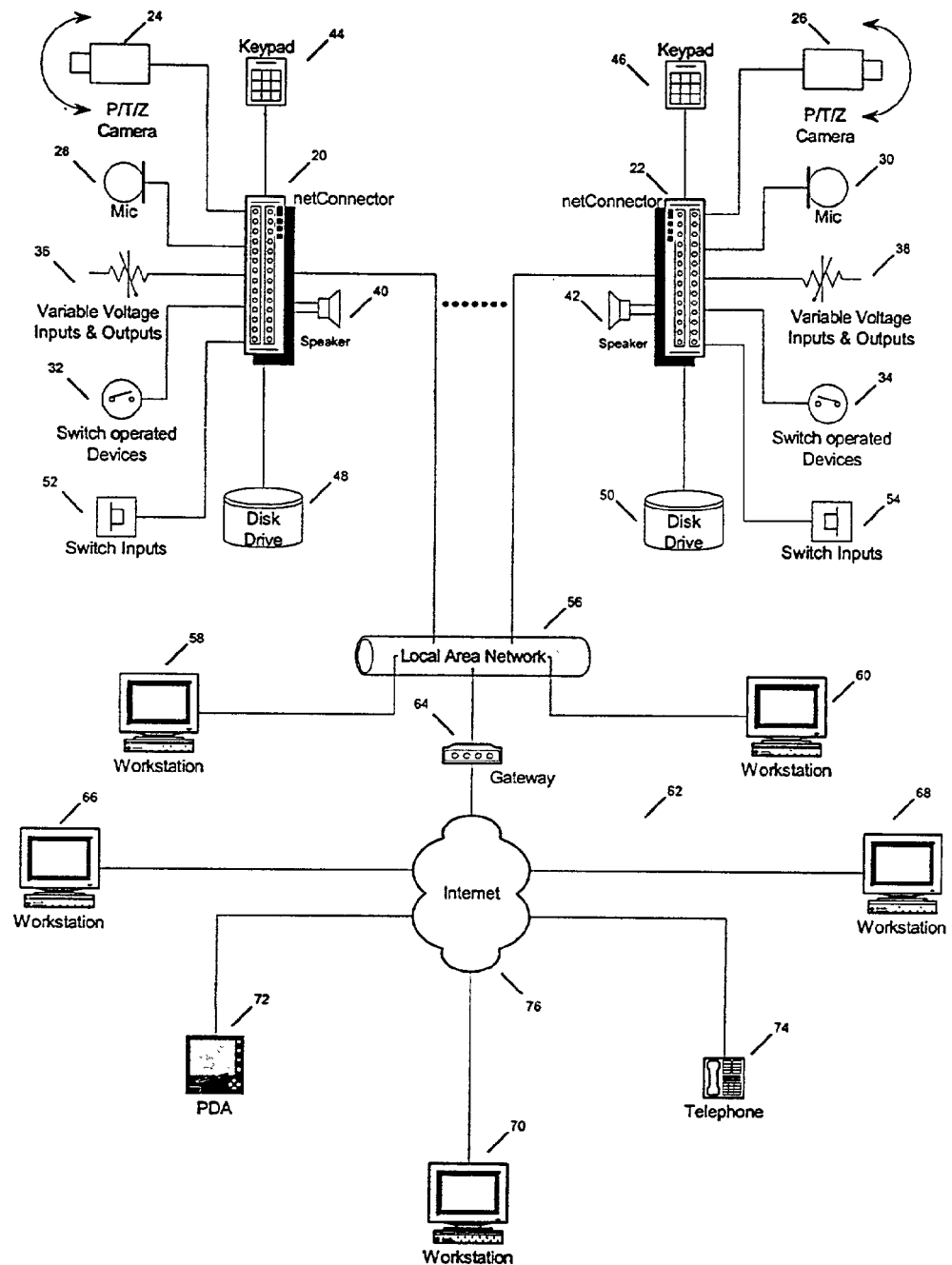
FIG. 1 is a block diagram illustrating a pair of analog gateways in accordance with the present invention, shown connected to various analog devices, which, in turn, are connected a local area network and a wide area network.

Referring to FIG. 1, a pair of analog gateways, 20 and 22, are shown connected to various analog devices, such as a pair of pan-tilt-zoom video cameras 24 and 26; microphones 28 and 30; switch operated devices 32 and 34; variable control devices 36 and 38, such variable voltage output sensors, speakers 40 and 42; keypads 44 and 46, as well as persistent storage devices, such as disk drives 48 and 50 and various sensor outputs, identified as switch inputs 52 and 54.

As shown, the analog gateways 20 and 22 are shown externally connected to the various analog devices enumerated above, in order to provide a relatively low cost upgrade of existing systems which do not include analog to digital interfaces. In such systems, the analog gateways 20 and 22 can be connected directly to the analog devices 24-42, 52 and 54 and interfaced directly the digital communication network. Alternatively, the analog gateways 20 and 22 may be embedded with one or more of the analog devices 24-42, 52 or 54 to provide an integrated device that is suitable for connection directly to a digital communications network.

As mentioned above, the analog gateways 20, 22 can operate in a stand alone mode of operation or a network mode of operation. In a network mode of operation, for example as illustrated in FIG. 1, the analog gateways 20, 22 may be connected to a single workstation (not shown) or to a local area network, generally identified with the reference numeral 56, which may include one or more workstations 58 and 60. The local area network 56 may, in turn, be connected to a wide-area network (WAN), generally identified with the reference numeral 62, by way of a conventional digital gateway 64. The WAN 62 may, in turn, include more and more workstations 66, 68 and 70, a personal digital assistant (PDA) 72, as well as the telephone 74, all connected together by way of a communication network 76, such as the Internet.

As will be discussed in more detail below, analog data from the various analog devices 24-42, 52 and 54 is digitized by the analog gateways 20, 22 and optionally encrypted and transferred to the LAN 56 and/or WAN 62. Thus, data from cameras 24, 26; microphones 28, 30; sensors with various voltage outputs 36 and 38; and sensors with switch inputs 52 and 54; may be retrieved by the various workstations 58 and 60; connected to the LAN 56 or retrieved by the workstations 66, 68, 70; PDA 72; or telephone 74, connected to the WAN 62. In addition, any of the workstations 58, 60 attached to the LAN; workstations 66, 68, and 70, connected to the LAN 62; PDA 72 or telephone 74 may be used to control devices connected to the analog gateways 20, 22, such as the switch operated devices 32, 34, sensors 36, 38 and variable voltage inputs as well as provide audio data to the speakers 40 and 42, thus providing bi-directional communication.

Referring to FIG. 2, the processing element 21, includes a digital signal processor 84, for example, a Texas Instruments Model No. TMS320VC5402PGE local memory, such as a static random access memory (SRAM) 86 and a FLASH memory 88. The SRAM 86 acts as a local scratch pad memory while the FLASH memory 88 is used to store program instructions for each of the first, second and third processing elements 21, 23 and 25. In order to minimize the cost of the analog gateway 20, 22, the total local memory devices used in the three processor elements 21, 23 and 25 may be limited to about one mega byte. The use of the FLASH memory 88 also enables the analog gateway 20, 22 to be custom programmed with an application specific program over the digital communication network or in the field. More particularly the analog gateway 20, 22 can be custom programmed by way of one of the work stations 58, 60 (FIG. 1) connected to the LAN 56; one of the workstations 66, 68 and 70 connected to the WAN 62; the PDA 72 or by way of the telephone 74. Alternatively, the FLASH memory can be field programmed.

Moreover, analog signals from the various analog devices 24 to 42, 52 and 54 (FIG. 1) can be pre-processed by way of application specific programs loaded into the FLASH 88. Such application specific programs can be used to detect specific conditions in order to condition the analog output signals from the analog devices 24 to 42, 52 and 54 prior to transmitting the data over the digital communication network. For example, video signals can be pre-processed at the analog gateway 20, 22 to recognize specific objects. Rather than transmitting video data or the digital communication network, the analog gateway 20, 22 would simply indicate that the specific object was detected. Various other applications for pre-processing analog signals prior to transmission over the digital communication network are contemplated.

The first processing element 21 may also include a standard digital network interface, 90, such as a 10 BT interface for connection to the LAN 56 (FIG. 1). In addition, one or more digital peripheral interfaces 92 may be provided, such as a general purpose input/output (GPIO) interface and one or more universal serial bus (USB) interfaces, such as Cypress Model No. SL 811 HS. The digital peripheral interfaces 92 are for use in connecting to various USB peripherals, such as a keypad 44, 46 and disk drive 48 and 50 (FIG. 1).

Finally, the first processing element 21 may include a control circuit 94 for interfacing the network interface 90 and digital peripheral interface 92 to the DSP 84. The control circuit 94 may be implemented by way of, as a complex programmable logic device (CPLD), for example a model number XC95144-10PQ160C, manufactured by Xilinx. The source code for the CPLD 94 is provided in Appendix A. The source code is in XABEL, an HDL tool from Xilinx.

The processing element 23 also includes a processor 94, a digital signal processor, for example, a model number TMS320VC5402PGE, as manufactured by Texas Instruments, connected to the interprocessor communication busses 27. The processing element 23 also includes local volatile memory 96, such as a SRAM. The processing element 23 may also include an asynchronous peripheral interface, for example, a model number PC16552D as manufactured by Texas Instruments for connecting to various asynchronous peripherals 100, such as modems and motors. The processing element 23 may also include an audio interface 102, which, in turn, includes an audio digital to analog converter (D/A) and an audio analog to digital convector (A/D) for interfacing the analog gateway 20, 22 with various audio peripherals, such as microphones 28, 30 and speakers 40 and 42 (FIG. 1). An exemplary audio A/D converter is a model number TLV320AIC14C as made by Texas instruments. An exemplary audio A to D converter for use in the audio interface 102 is also model number TLV320AIC14C manufactured by Texas instruments.

A general purpose analog interface 104 may also be provided for interfacing with various analogs devices 106, such as lights, and various sensors, including temperature sensors, smoke sensors, pressure sensors and meters and various actuators, generally identified in FIG. 1 as variable voltage inputs, and output devices 36, 38; switch operated devices 32, 34 and devices 52, 54 which accept switch inputs. The general purpose analog interface 104 includes a D/A converter, for example a model number MAX5100AEUP as manufactured by Maxim Semiconductors and an A/D converter, for example a model number MAX113CAG as manufactured by Maxim Semiconductors, as well as one or more relays, for example, a model number TQ2SL-3V as manufactured by Aromat for interfacing with various switch operator devices 32, 34 (FIG. 1).

Program instructions for the second processing element 23 are stored in the FLASH memory 88 as discussed above, and retrieved by way of the interprocessor communication busses 27 on power up of the analog gateway 20, 22 and loaded into the local volatile memory 96. In applications in which the analog gateway 20, 22 is used for secure communications, the processor 94 performs the encryption/decryption as well as the controlled processing for the asynchronous peripheral interface 98, audio interface 102 and general purpose interface 104.

The third processing element 25 includes a processor 106, such as a digital signal processor, for example a model number TMS320VC5402PGE as manufactured by Texas Instruments, connected to the interprocessor communication busses 27. The third processing element 25 may also include local volatile memory such as a SRAM 108, which acts as a scratch pad memory as well as a frame SRAM 110. On power up, programmed instructions for the process 106, pre-loaded in the FLASH memory 88, are loaded into the SRAM 108. The processor 106 may be used for encoding of the video data from the various video sources, such as the cameras 24 and 26 into a format suitable for transmission over the digital communication network, such as MJPEG format. The analog processing element 27 includes a video A/D converter 112 for converting analog video signals to digital format. The video A/D converter 112 may be a model number SAA7111AH as manufactured by Philips. A control circuit 114 is provided to control the video A to D converter 112 and assemble the data into video frames for storage in the frame SRAM 110. CPLD Source in separate file The control circuit 114 be implemented as a CPLD, for example, a model number XC95144-10PQ160C manufactured by Xilinx. The control circuit 114 may be used to control the video data from the video A/D 112 to the A. frame RAM 110. The source code for the CPLD 114 is provided in Appendix B. The source code is an XABEL, an HDL tool from Xilinx.

Figure 3:
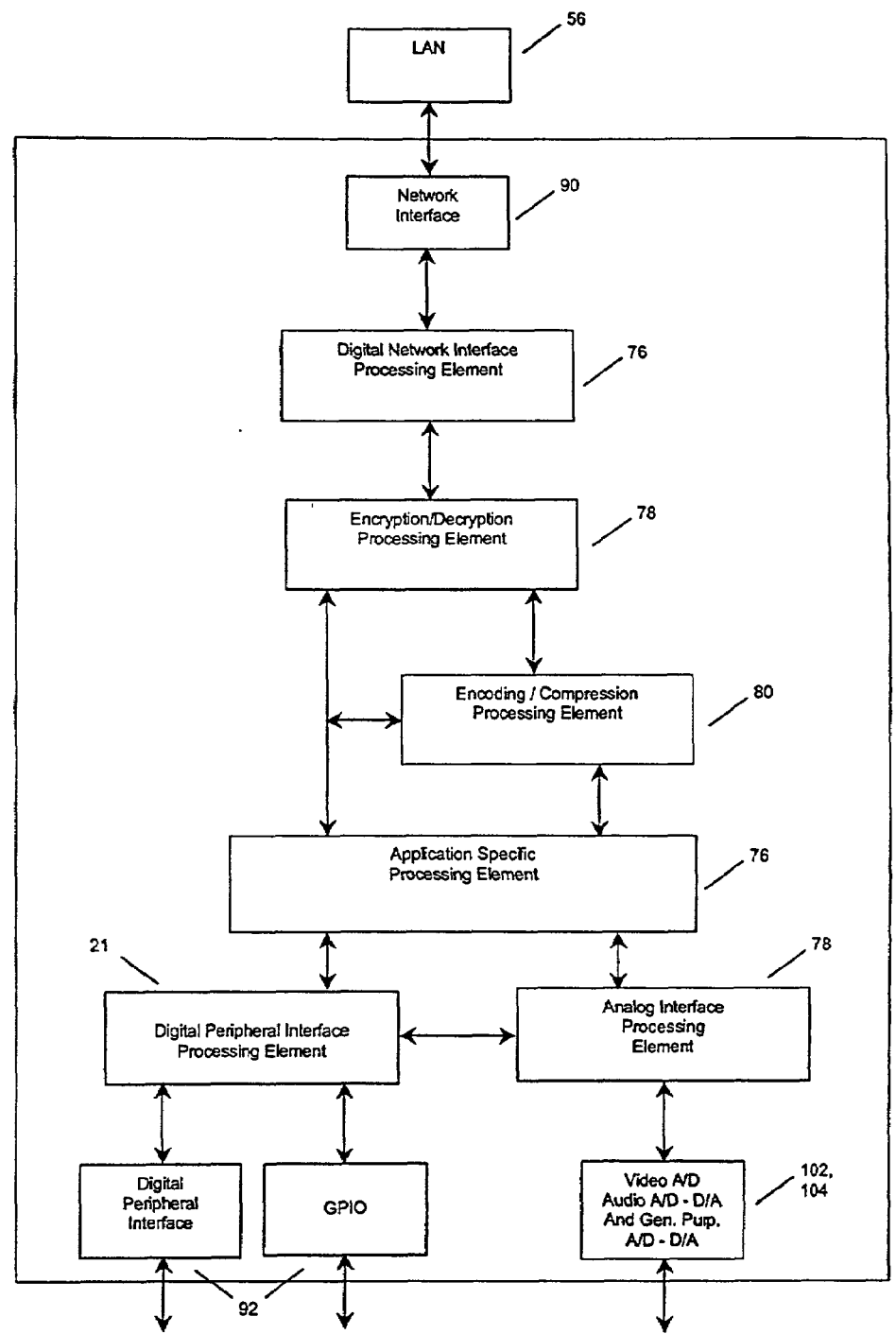
FIG. 3 is a block diagram of the analog gateway shown in FIG. 2, illustrating in greater detail the pipelined arrangement of each of the processing elements.

The pipelined architecture, as mentioned above, provides improved performance of the analog gateway 20, 22, while at the same time provides an analog gateway that is lower in cost than known systems. FIG. 3 illustrates exemplary data flow through the pipeline formed from the first, second and third processing elements 21, 23 and 25. In this example, analog information is received from the various analog devices by way of the audio A/D converter 102 or general purpose A/D) convener 104 and convened to digital format by the second processing element 23 under the control of the processor 94. This digitized data is then passed to the first processing element 21 which performs applications specific processing on the data as discussed above. The digitized data and optional custom processed data is then passed to the third processing element 25 which encodes the digitized data for transmission over the digital network. The encoded digital data is then passed back to the second processing element 23 for optional encryption. The encrypted data is then passed to the first processing element 21, which transmits the data to the requesting network device (i.e. workstation 58, 60, 66, 68, 70, PDA 72 or telephone 74, ect.) by way of the network interface 90 and LAN 56.

The above example is based upon the analog gateway 20, 22 being operated in a network mode of operation. If the analog gateway 20, 22 is being operated in a stand alone mode of operation, the analog data is merely stored in a local disk drive 48, 50 for later retrieval by way of the network. More particularly, in a stand alone mode of operation, analog data received by, for example, the audio interface 102 or general purpose interface 104 in the second processing element 23 or the video interface 112 of the processing element 25 is converted to digital data. This digital data is then pushed to the processing element 21 by way of the interprocessor communication busses 27 where it is transferred to a local disk drive 48, 50 under the control of the control circuit 94 and the general purpose interface 92.

The stored data can then be requested by way of a network request received by the first processing element 21, which receives the request by way of the network interface 90. The stored data which may be optionally encrypted, is retrieved from the local disk drive 48, 50. If the data is not encrypted, it may be optionally passed to the second processing element 23 for encrypting. The encrypted data is passed back to the first processing element 21 where, it is, in turn, passed on to the network requestor by way of the processor 84, control circuit 94 and network interface 90.

Figure 4:
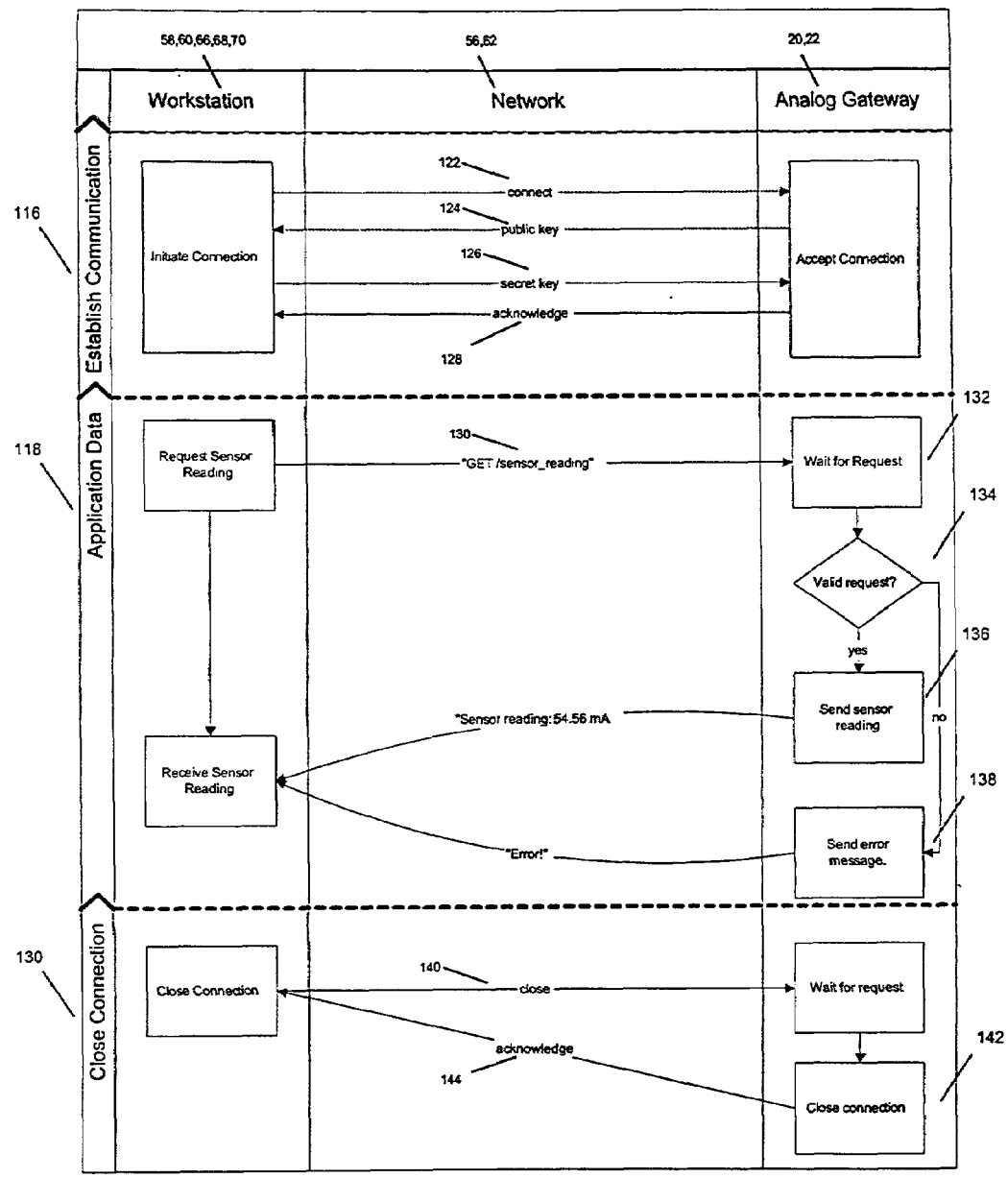
FIG. 4 is a system flow diagram illustrating the data flow between the analog gateway in accordance with the present invention and a workstation connected thereto.

FIG. 4. illustrates a system flow diagram illustrating data flow as a result of a communication from a workstation to the analog gateway 20, 22. As shown, a session between a workstation 58, 60, 66, 68 and 70 and the analog gateway 20, 22 consist of three states: a connection establishment state 116; an application data flow state 118 and a close connection state 120. The connection establishment state consist of two stages. First, an unencrypted communication path is established between the workstation 58, 60, 66, 68, 70 and the analog gateway 20, 22 using, for example, transport layer security (TLS) protocol, as discussed above. More particularly, in the connection establishment state 116, a workstation 58, 60, 66, 68, or 70 sends a request for connection to the analog gateway 20, 22 as indicated by the line 122. In response to that request, the analog gateway 20, 22 returns a public key to the requesting workstation 58, 60, 66, 68 or 70, as indicated by the line 124 in accordance with the TLS record protocol. The public key can be used for transmissions without data transmissions which are not encrypted. In embodiments where the transmissions are encrypted the connection establishment state 116 also follows the TLS handshake protocol in which the workstations 58, 60, 66, 68 and 70 negotiate a secret key that is used for the session. As shown in FIG. 4, a secret key, as indicated by the line 126, is sent to the analog gateway 20, 22 and acknowledged, as indicated by the line 128. Once the private keys have been exchanged, all further communication during the session is encrypted using the private keys.

The next state is the application data state in which data is transferred over the encrypted communication path. As shown, the data may be retrieved using, for example, Hypertext Transfer Protocol (HTTP). For example, a workstation 58, 60, 66, 68, or 70 may issue a HTTP "GET" request for a given sensor as indicated by the arrow 130 to retrieve a sensor reading. As such, the analog gateway 20 and 22 is normally in a wait-for-request state, as indicated by the block 132. Once the analog gateway 20, 22 receives a request for data from a workstation 58, 60, 66, 68 or 70 the analog gateway 20, 22 verifies the validity of the request in step 134. Request verification consists of matching the request with the predefined list of all valid requests for this particular analog gateway.

If the request is verified, the analog gateway 20, 22 responds in step 136 by sending the requested sensor reading over the network 56, 62 to the requesting device. Alternatively, if the request is not valid, an error message is sent to the requesting device in step 140. After the sensor reading is received, the requesting device initiates a close connection request to the analog gateway 20, 22 as indicated in step 140. Once the request is received by the analog gateway 20, 22, the connection is closed as indicated in step 142 and an acknowledgment is returned in step 144.

Figure 5:
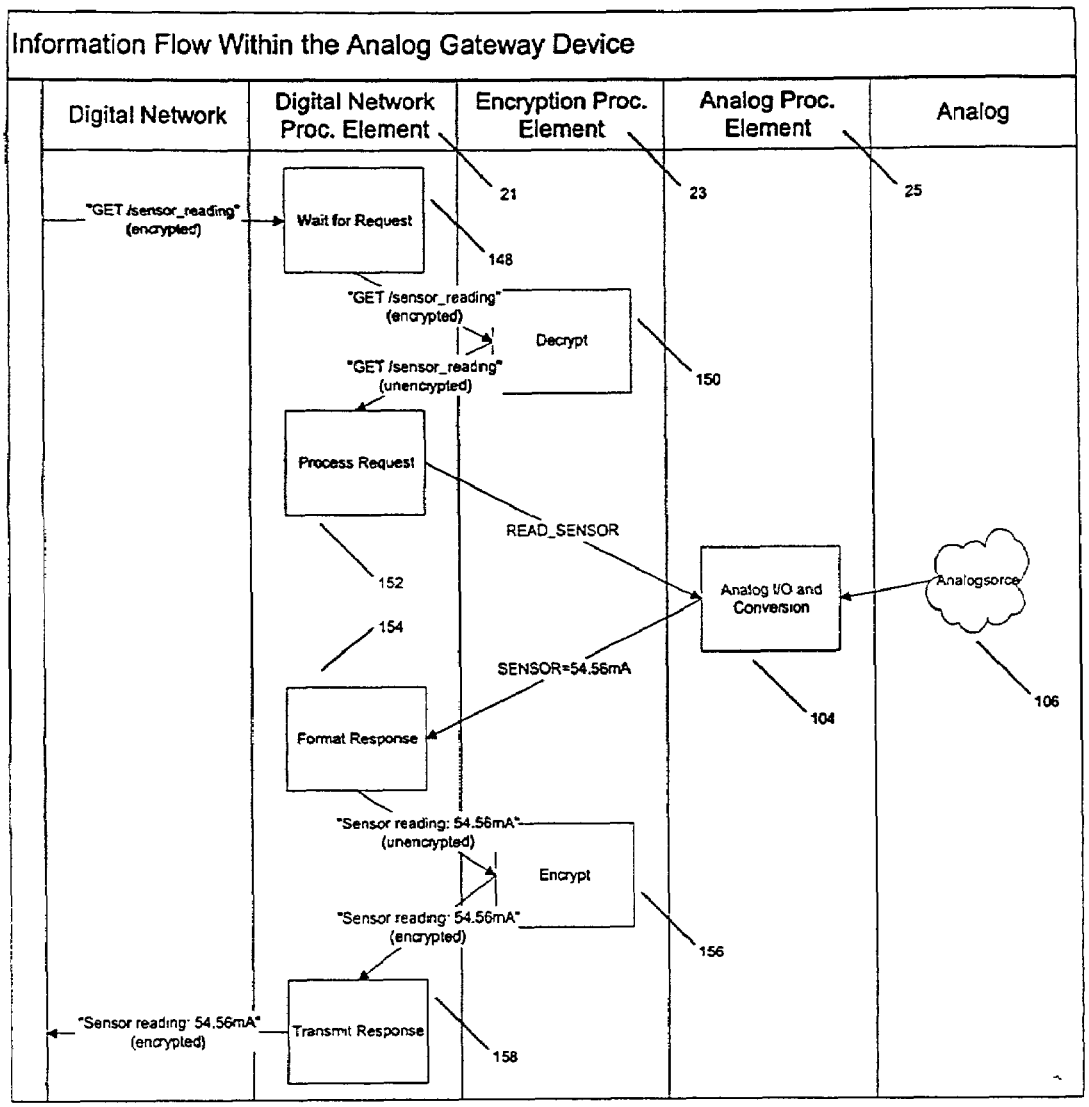
FIG. 5 is an exemplary system flow diagram illustrating the data flow of the analog gateway in accordance with the present invention.

FIG. 5 is a flow diagram illustrating the data flow within the analog gateway 20, 22, in response to the network request for a sensor reading, illustrated in FIG. 4. Initially the analog gateway 20, 22 and, in particular, the first processing element 21 is in a "wait for request" state 148. Once a request is received, assuming the request is encrypted, the request is pushed to the second processing element 23 for decrypting in step 150. The decrypted request is returned to the first processing element 21 for processing in step 152. In this case, since the request is for a sensor reading, the request is returned to the second processing element 23 and in particular, the sensor reading is read from the sensor 106 by way of the general purpose interface 104 (FIG. 2) under the control of the processor 94. The sensor reading is digitized by the general purpose interface 104 and returned to the first processing element 21 for formatting in step 154. Once the response is formatted (i.e., "Sensor reading: 54.56 mA"), the response is sent to the second processing element 23 for encrypting in step 156. The encrypted response is returned to the first processing element 21 for transmission to the network in step 158.

Figure 6A:
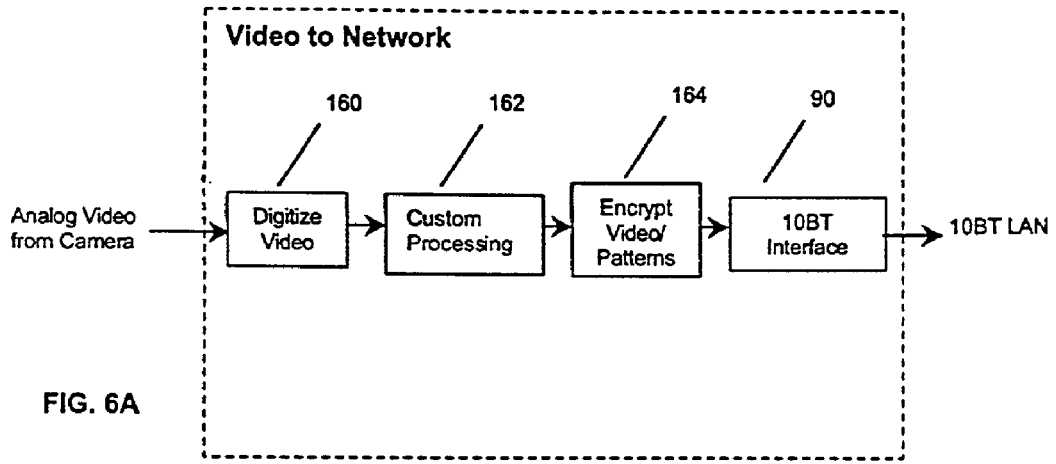
FIGS. 6A, 6B and 6C are data flow diagrams illustrating data retrieval from an attached analog camera in various modes of operation.
Figure 6B:
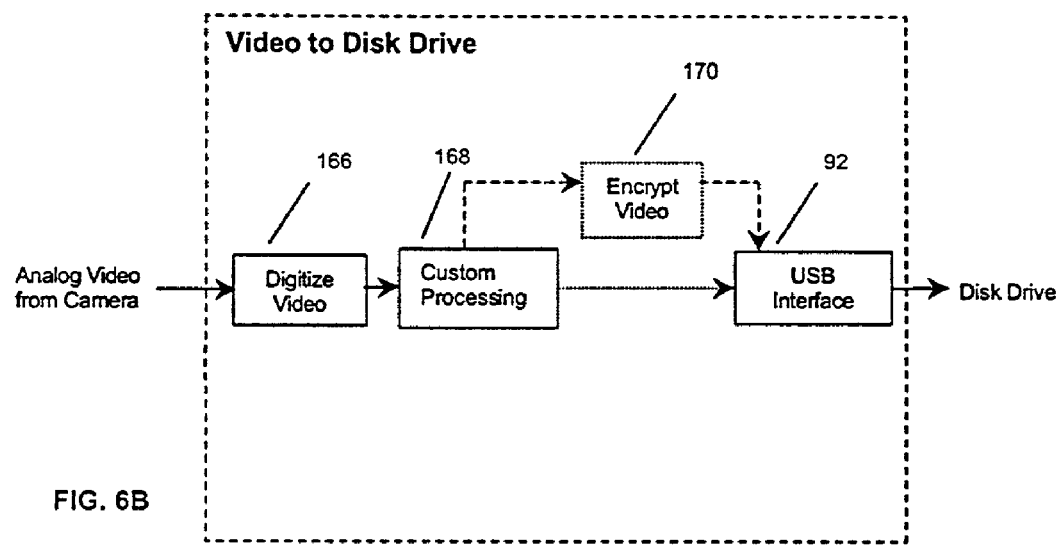
Figure 6C:
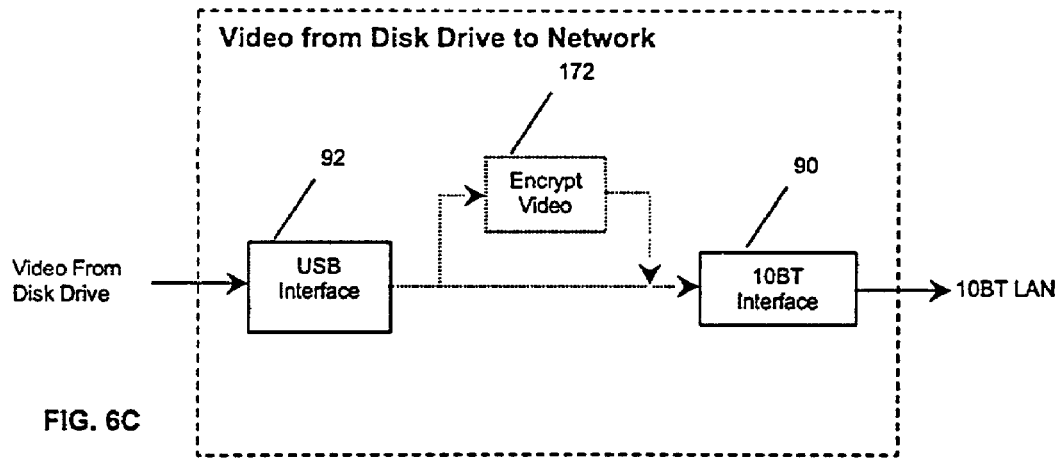

FIGS. 6A, 6B and 6C illustrate data flow within the analog gateway 20, 22 during video data retrieval. Referring first to FIG. 6A, analog video data from a camera 24, 26 (FIG. 1) is received by the analog gateway 20, 22 and in particular, the video interface 112 (FIG. 2) of the third processing element 25 and digitized in step 160. The digitized data is formatted into frames and pushed to the first processing element 21, for example, for custom processing in step 162. After custom processing, the video data is sent to the second processing element 23 for encryption in step 104. The encrypted video data is returned to the first processing element 21 for transmission to the network by way of the network interface.

FIG. 6B illustrates operation of an analog gateway connected to a video camera 24, 26 (FIG. 1) in a stand alone mode of operation. In this mode of operation, video data from one of the cameras 24, 26 is digitized in step 166 by way of the video interface 112 (FIG. 2) in the first processing element 21 for custom processing in step 168. The data is then stored in the disk drive 48.50 (FIG. 1) by way of the peripheral interface 92 in the first processing element 21. Alternatively, if the video data is to be stored in encrypted format, the video data is transferred to the second processing element 23 (FIG. 2) for encrypting. The encrypted data is then returned to the first processing element 21 for transfer to the disk drive 48, 50 as discussed above.

Finally, FIG. 6C illustrates retrieval of stored video data by the network. In particular, stored video data is retrieved from the local disk drives 48, 50 by way of the digital peripheral interface 92 in the first processing element 21. The retrieved video data, if it is not encrypted, is passed to the second processing element 23 for encrypting as indicated in step 172. The encrypted data is returned to the first processing element 21 for transfer to the network by way of the network interface 90. Alternatively, if the stored video data is already encrypted, it is passed directly from the digital peripheral interface 92 directly to the network interface 90.

Figure 7A:
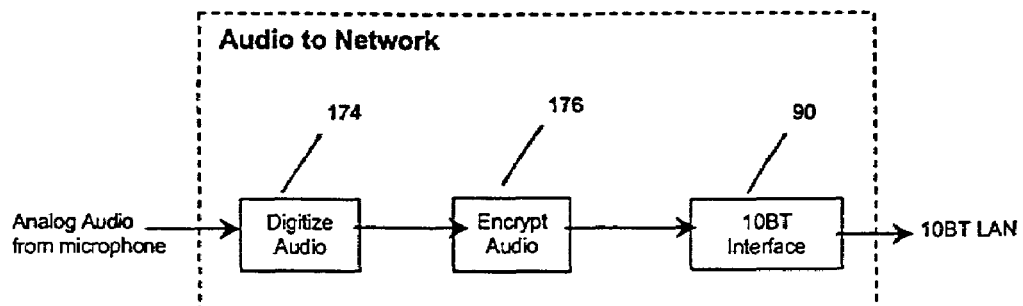
FIGS. 7A, 7B and 7C are similar to FIGS. 6A, 6B and 6C, but illustrating audio data retrieval from a microphone.
Figure 7B:
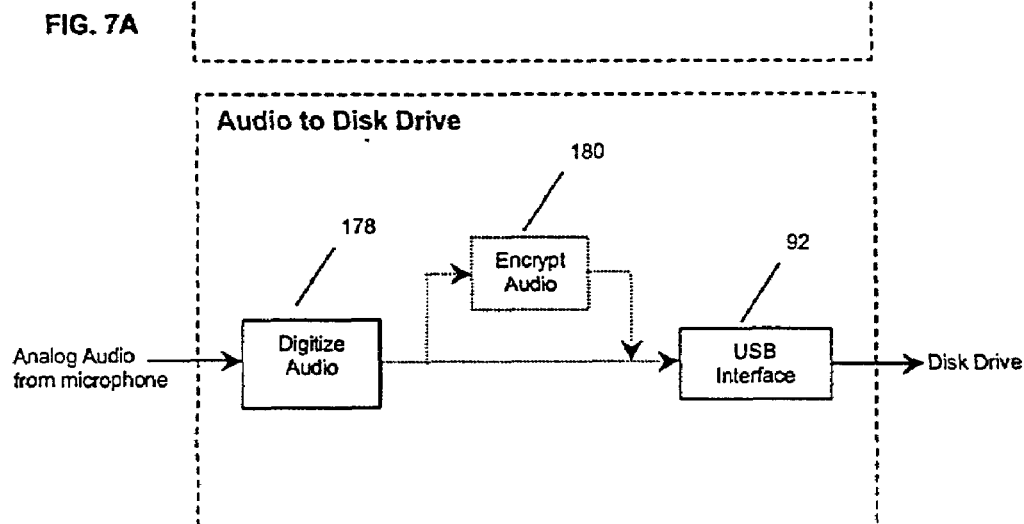
Figure 7C:
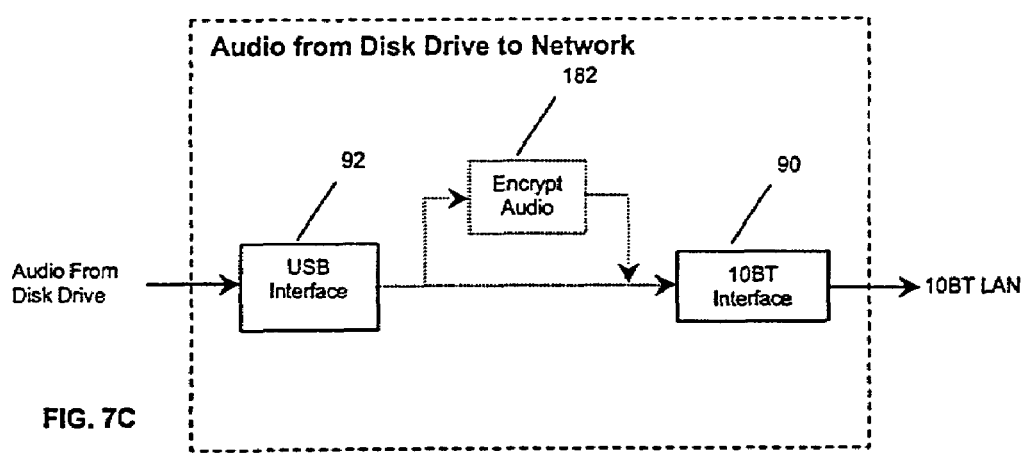

FIGS. 7A, 7B and 7C illustrate the information flow within the analog gateway 20, 22 regarding audio data. Referring first to 7A, this diagram illustrates retrieval of analog audio data from a microphone 28, 30 (FIG. 1). Initially, audio data from the microphones 28, 30 is digitized in real time as illustrated by the box 174 by way of the audio interface 102 in the second processing element 23. The digitized audio data is encrypted in step 176 by the second processing element 23 and passed on to the first processing element 21 for transmission to the network by way of the network interface 90.

FIG. 7B illustrates a condition where analog audio data from a microphone 28, 30 is stored in local disk drive 48, 30. In this situation, analog audio data is digitized as indicated in step 178 by the analog interface 102 in the second processing element 23. The analog data may be stored in encrypted or unencrypted format. If the audio data is to be stored in encrypted format, the digitized audio is encrypted by way of the second processing element 23, as indicated in step 170, and passed on to the first processing element 21, which transfers the encrypted data to the digital peripheral interface 92 and, in turn, to the local disk drive 48, 50. Alternatively, digitized, non-encrypted data may be transferred directly to the digital peripheral interface 92 for storage on the local disk drive 48, 50.

FIG. 7C illustrates the information flow within the analog gateway 20, 22 during a condition when audio data is being retrieved from a disk drive 48, 50. In this situation, the stored audio data is retrieved by way of the digital peripheral interface 92 and passed directly to the network interface 90 if the audio data was stored in encrypted format. If the audio data was stored in non-encrypted format, the audio data is transferred to the second processing element 23 for encryption as indicated in step 182 and then passed back to the first processing element 21 for transmission to the digital network.

Figure 8A:
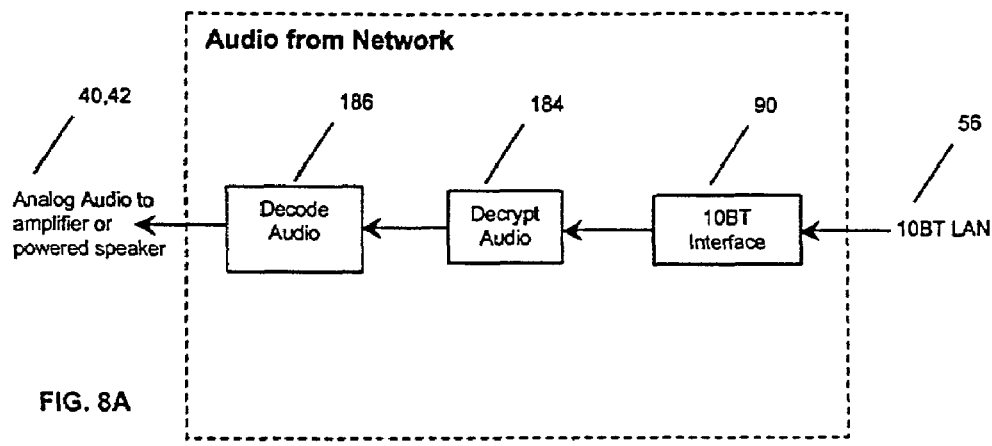
FIGS. 8A, 8B and 8C are similar to FIGS. 6A, 6B and 6C, but illustrating an audio output to a loud speaker or amplifier attached to the analog gateway in accordance with the present invention.
Figure 8B:
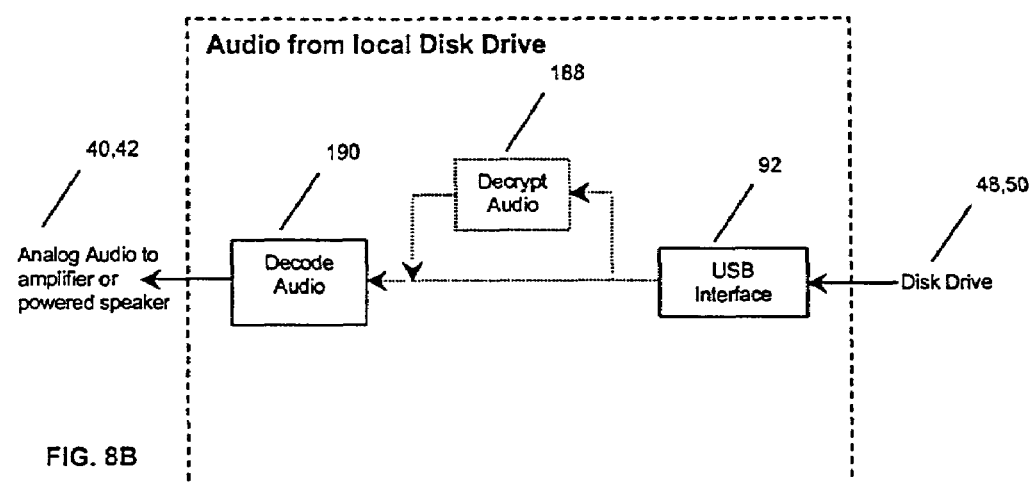
Figure 8C:
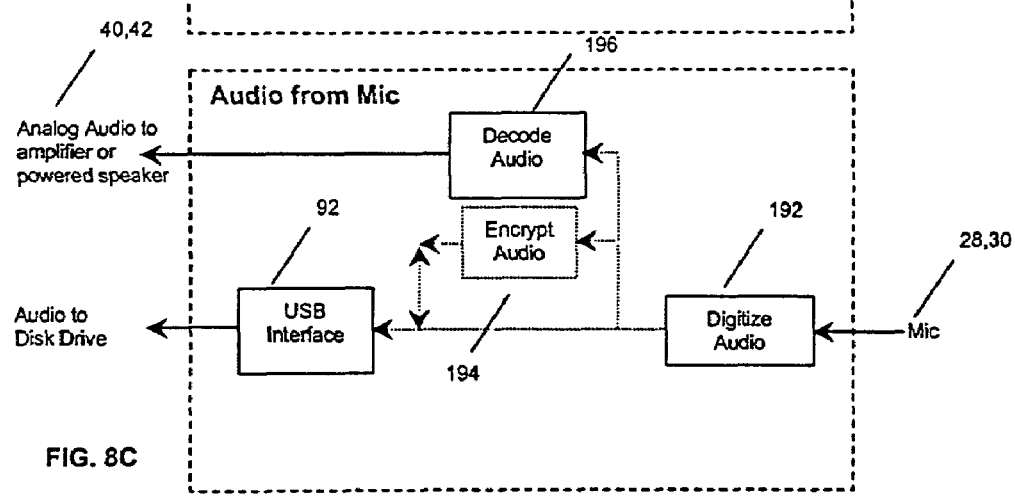

FIGS. 8A, 8B and 8C illustrate the information flow within the analog gateway 20, 22 during a condition when audio information is passed from the network to a speaker 40, 42 connected to the analog gateway 20, 22. More particularly, FIG. 8A illustrates the condition when analog data is passed from the network to a speaker 40, 42 attached to the analog gateway 20, 22. Initially, the digitized analog data is passed to the digital network interface 90 within the first processing element 21. The digitized audio data, if in encrypted form, is then passed to the second processing element 23 for decrypting, as indicated by step 184. The decrypted data is then passed to the general audio interface 102 (FIG. 2) where it is converted to analog form by the audio analog interface 102 and passed to the speakers 40 and 42 in step 186.

FIG. 8B illustrates a condition when audio data is passed from the local disk drive 48, 50 to a speaker 40, 42, attached to the analog gateway 20, 22. During this condition, the digitized audio data is retrieved from the local disk drive 48, 50 by way of the digital peripheral interface device 92 within the first processing element 21. If the digitized audio data is encrypted, the data is passed to the second processing element 23 for decrypting as indicated in step 188. The decrypted data is then passed to the general analog interface 102 where it is converted to analog data by way and passed on to the local speaker 40, 42 in step 190.

FIG. 8C illustrates a condition where analog data from a microphone 28, 30, attached to the analog gateway 20, 22, is passed on to a speaker 40, 42, also attached to the analog gateway 20, 22 and/or stored in a local disk drive 48, 50. During this condition, analog audio data is received by the audio interface 102 within the second processing element 23 and digitized as indicated in step 192. The digitized audio data may be stored in a local disk drive 48, 50 and either encrypted or non-encrypted format. If the digitized audio data is to be stored in unencrypted format, the digitized audio from the audio interface 102 in the second processing element 23 is directed to a digital peripheral interface 92 in the first processing element 21 and stored on the local disk drive 48, 50. Alternatively, if the digitized audio is to be stored in encrypted format, the digitized audio from the audio interface device 102 is encrypted by way of the second processing element 23 before it is transferred to the digital peripheral interface 92 in the first processing element 21, as indicated by step 194.

Alternatively, analog data from the microphones 28 and 30 can be broadcast directly to the local speakers 40, 42. During this condition, analog audio data is received by the audio interface 102 in the second processing element 23. This data is passed to the audio interface 102 in step 194 where it is converted to analog format and broadcast over the local microphones 40, 42.

Figure 9A:
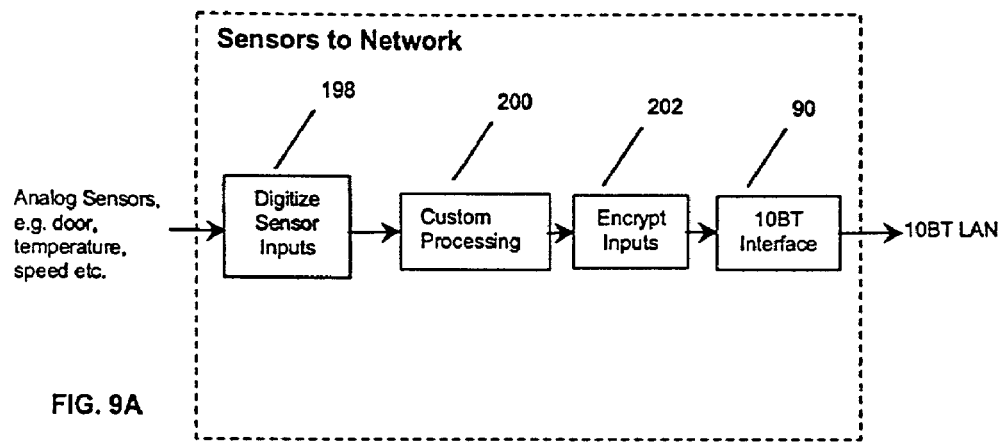
FIGS. 9A, 9B and 9C are similar to FIGS. 6A, 6B and 6C, but illustrating data retrieval from a sensor attached to the analog gateway.
Figure 9B:
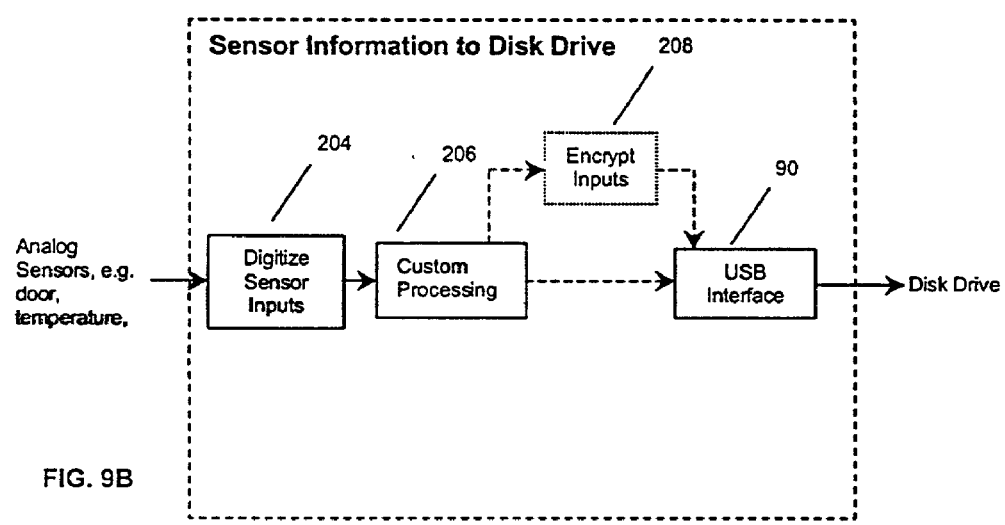
Figure 9C:
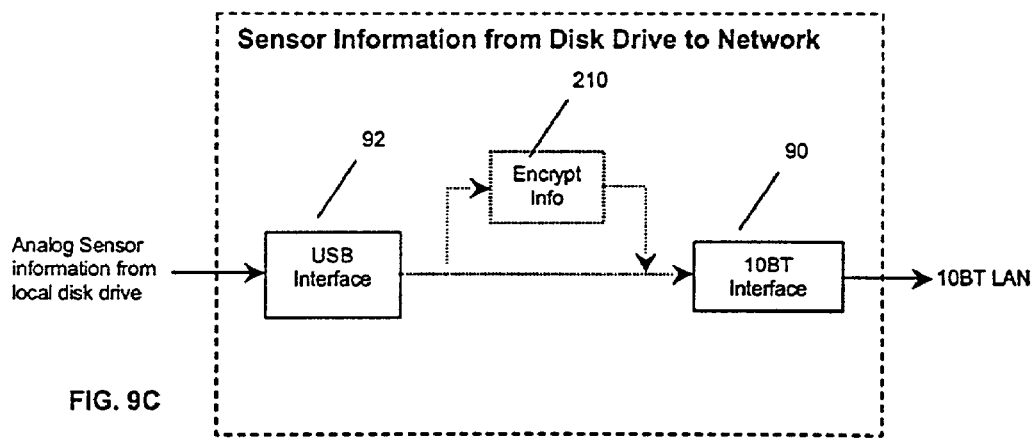

FIGS. 9A, 9B and 9C illustrate retrieval of analog information. In particular, FIG. 9A illustrates the information flow within the analog gateway 20, 22 during the condition when analog data is being retrieved by the network. During this condition, sensor inputs are received by the general purpose analog interface 104 in the second processing element 23 and digitized, as indicated in step 198. The digitized signals are optionally passed on to the first processing element 21 for any optional custom processing, as indicated in step 200. After the custom processing, the digitized sensor inputs are optionally passed to the second processing element 23 for optional encrypting in step 202. The encrypted inputs are then passed back to the first processing element 21 for transfer to the network by way of the network interface 90.

FIG. 9B illustrates a condition where sensor information is stored in a local disk drive 48, 50. In this situation, analog sensor inputs are received by the general purpose analog interface 104 in the second processing element 23 and digitized, as indicated in step 204. If custom processing is to performed on the analog inputs, as indicated in step 206, the digitized sensor inputs are transferred to the first processing element 21 for custom processing. The digitized inputs may be stored in local disk drives 48, 50, either in encrypted or non-encrypted format. If the digitized inputs are to be stored in encrypted format, the digitized inputs (after any custom processing) are passed back to the second processing element 23 for encryption, as indicated in step 208. The encrypted signals are then passed back to the first processing element 21 for storage on a local disk drive 48, 50 by way of the digital peripheral interface 92. Alternatively, if the digitized inputs are to be stored in non-encrypted format, the digitized sensor inputs from the audio interface 102 in the second processing element 23 are passed directly back to the processing element 76 for transmission to disk drive 48, 50.

FIG. 9C illustrates a condition when information stored in the local disk drive 48, 50 is retrieved and transmitted to the network. In this condition, stored digitized sensor data is retrieved from the local storage device 48, 50 by way of the digital peripheral interface 92 in the first processing element 21. If the sensor data was stored in unencrypted format, the data may be passed to the second processing element 23 for encryption, as indicated in step 210. After encryption, the encrypted data is returned back to the first processing element 21 for transmission to the network by way of the network interface 90. Alternatively, if the sensor data was stored in encrypted format, the encrypted sensor data retrieved from the disk drives 48, 50 is transferred directly to the network interface 90.

Figure 10A:
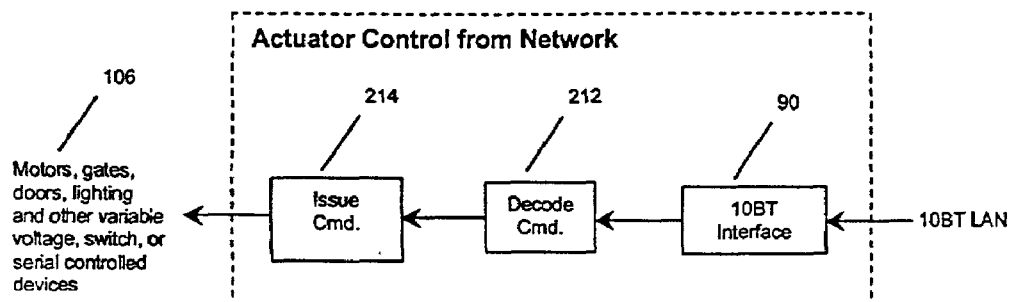
FIGS. 10A, 10B and 10C are similar to FIGS. 6A, 6B and 6C, but illustrating network control of an actuator connected to the analog gateway.
Figure 10B:
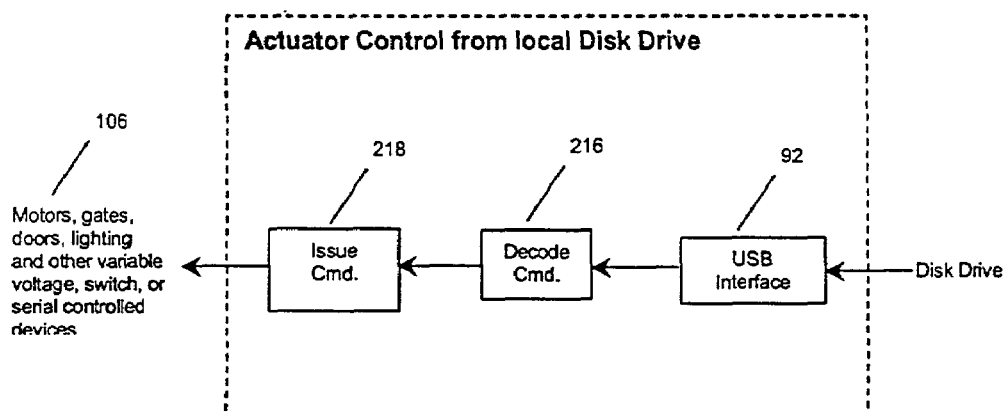
Figure 10C:
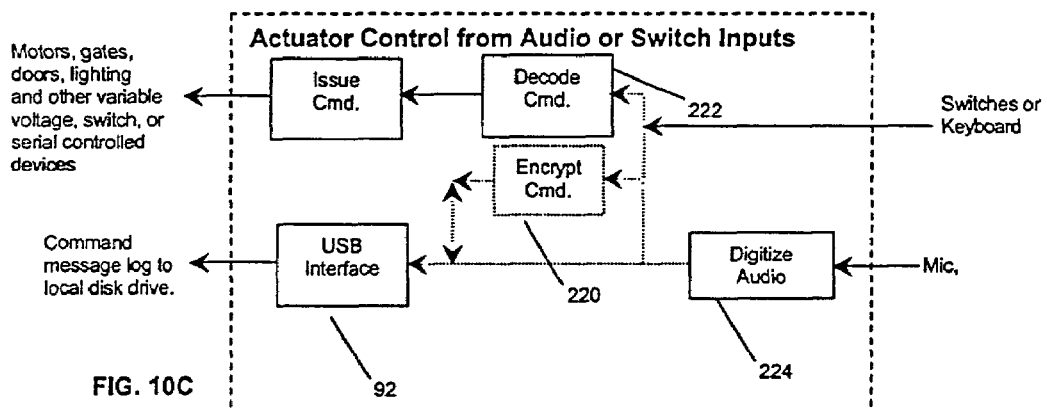

FIGS. 10A, 10B and 10C illustrate the information flow within the analog gateway 20, 22 during a condition when a actuator command is being transferred from the network to an actuator connected to the analog gateway 20, 22. FIG. 10A illustrates a condition where a network command is used to control a device connected to the analog gateway 20, 22. Initially, the command is received by the network interface 90 in the first processing element 21. If the command is encrypted, the command is transferred to the second processing element 23 for decryption. The decrypted command is then decoded by the general purpose interface 104 (FIG. 2), as indicated by step 212. The decoded command is issued to one of the various analog devices 106, connected to the general purpose analog interface 104 in step 214.

FIG. 10B illustrates a condition where a command is executed from a local disk drive 48, 50. During this condition, the command is retrieved from the local disk drive 48, 50 by way of the digital peripheral interface 92 in the first processing element 21 by way of the digital peripheral interface 92. If the command was stored in an encrypted format, the retrieved command is passed to the second processing element 23 where it is decrypted. The decrypted command is then decoded, as indicated in step 216, and converted to analog format by way of the digital to analog converter in the general purpose analog interface device 104 and passed on to the analog devices, as indicated in step 218.

Finally, FIG. 10C illustrates a condition where one of various inputs from either the microphones 28, 30; switch inputs 52, 54 or keypads 44 and 46 are either directed to an analog device or stored in a local disk drive. Initially, audio data from the local microphone 28, 30 is received by audio interface 102 in the second processing element 23. Such analog data is digitized as indicated in step 220. The digitized data may be stored in either encrypted or non-encrypted formats. If the data is to be stored in unencrypted format, the digitized data is simply passed back to the first processing element 21 where it is passed on to the local disk drive 48, 50 by way of the digital peripheral interface 92. Alternatively, the digitized data may be encrypted by the second processing element 23, as indicated in step 220, before being passed on to the first processing element 21 for transfer to the local disk drive 48, 50.

Switch inputs and inputs from the keypad 48, 42 are connected to the digital peripheral interface 92 within the first processing element 21. As indicated in step 222, commands from these devices are decoded and passed back to the second processing element 23 where they are converted either to an analog output or to a relay output to control the various analog devices 106 connected to the general purpose analog interface 104 within the second processing element 23.

FIG. 11 illustrates the analog gateway 20, 22 in a stand alone configuration. In this configuration the analog gateway is not connected to a network, but is useful in collecting information and controlling external devices. In this mode of operation, the analog gateway 20, 22 operates under the control of a program stored in the FLASH memory 88 in the first processing element 21. During operation, the analog gateway 20, 22 is able to perform all information collection and external control functions that it can perform in a network mode. In addition, all information that is collected may be encrypted before storage to either the FLASH memory 88 or local disk drive 48, 50. In such a mode of operation, the analog gateway 20, 22 can be used for information collection and external control which can be collected and later connected to a digital network to analyze the information gathered.

Figure 12:
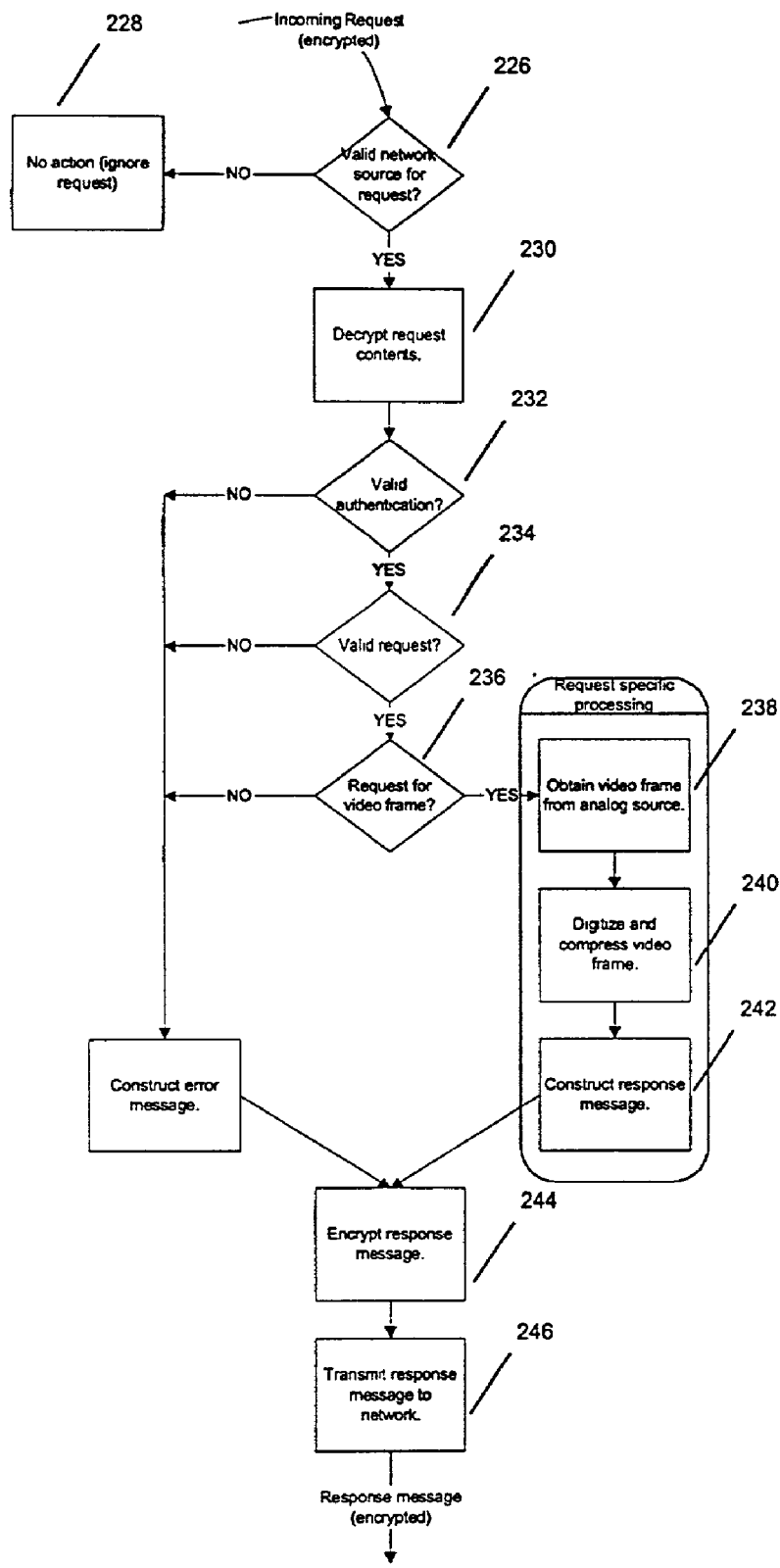
FIG. 12 is a flowchart illustrating video frame retrieval.
Figure 13:
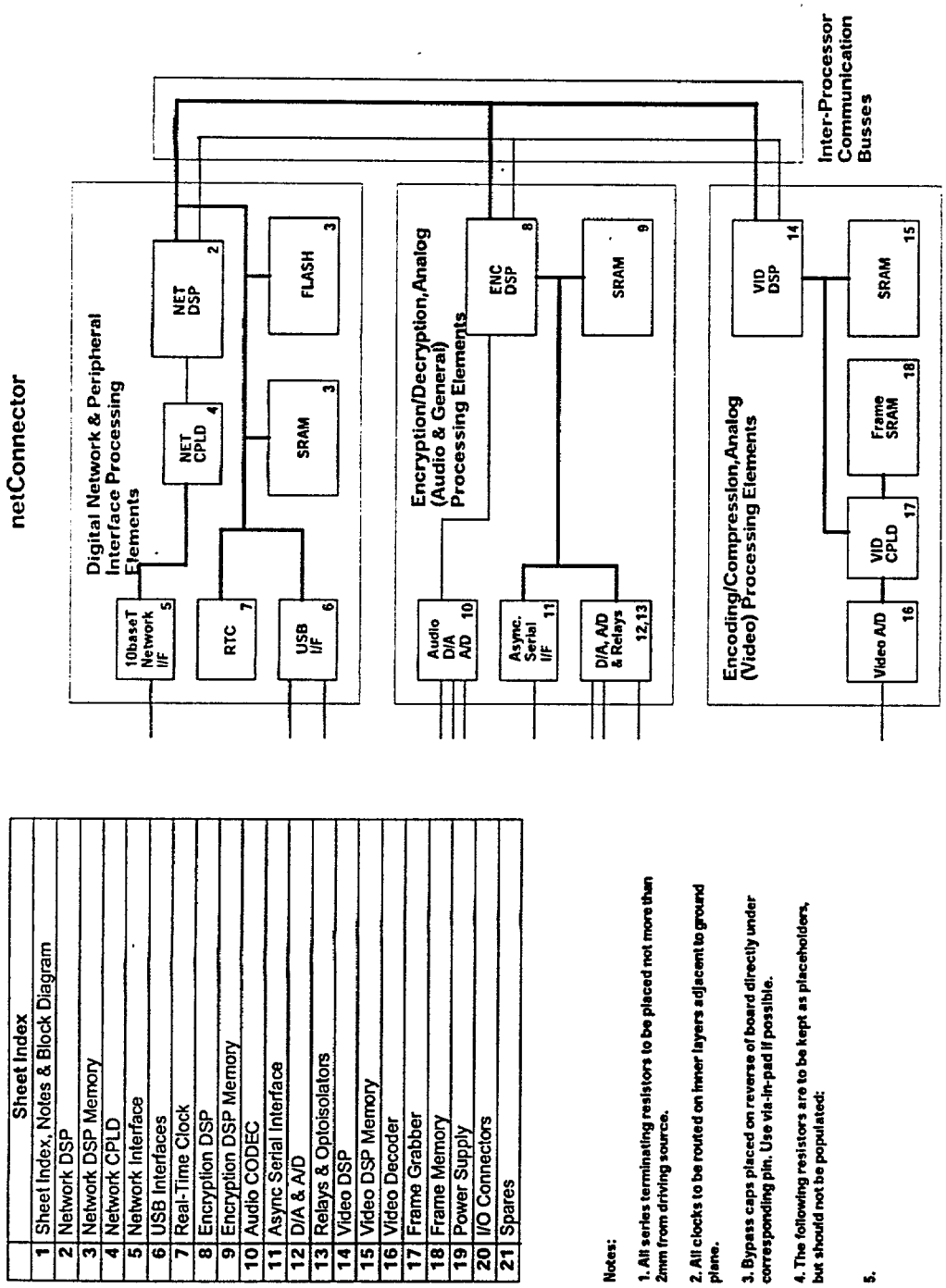
FIGS. 13-33 are exemplary schematic diagrams of the analog gateway in accordance with the present invention
Figure 14:
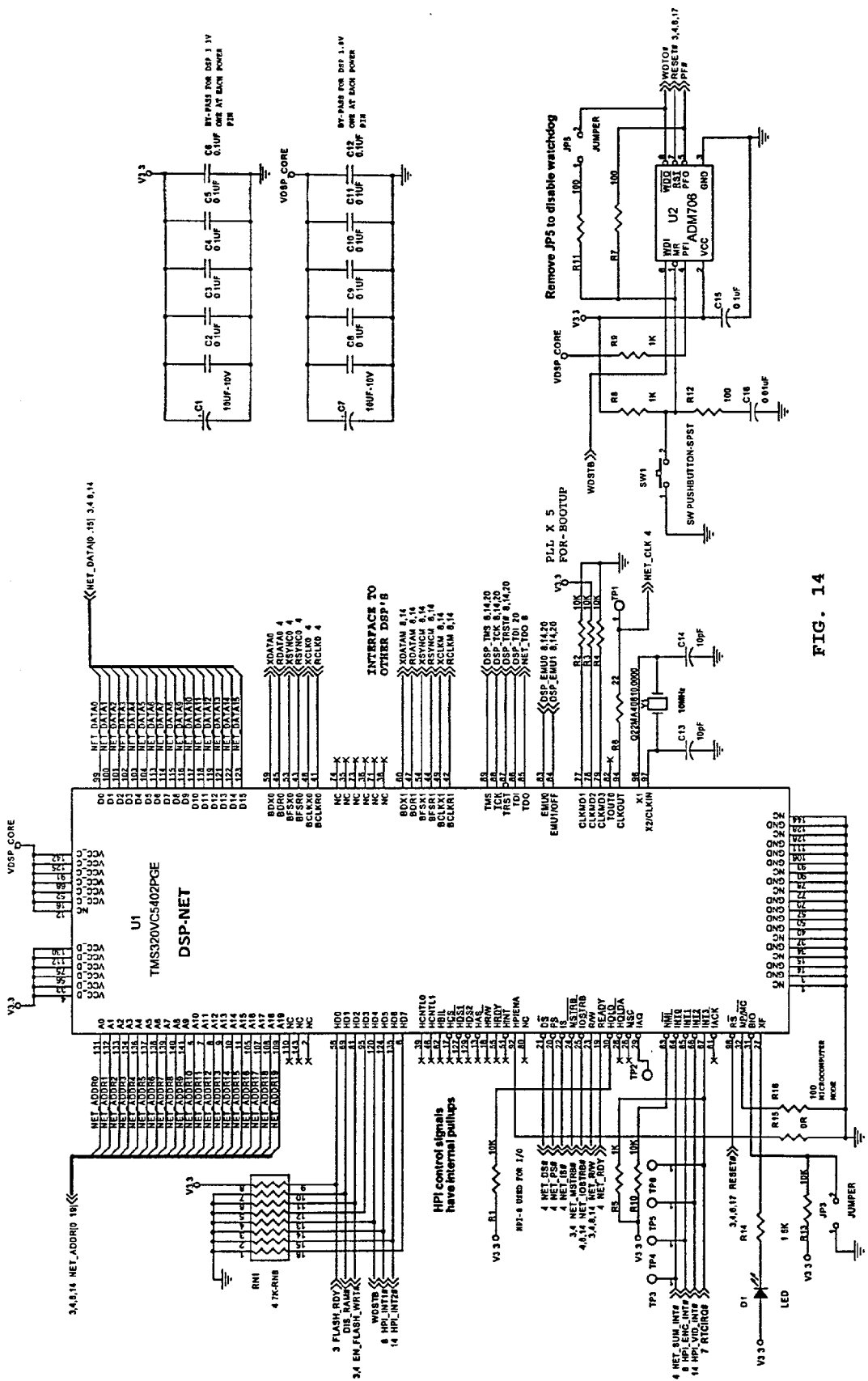
Figure 15:
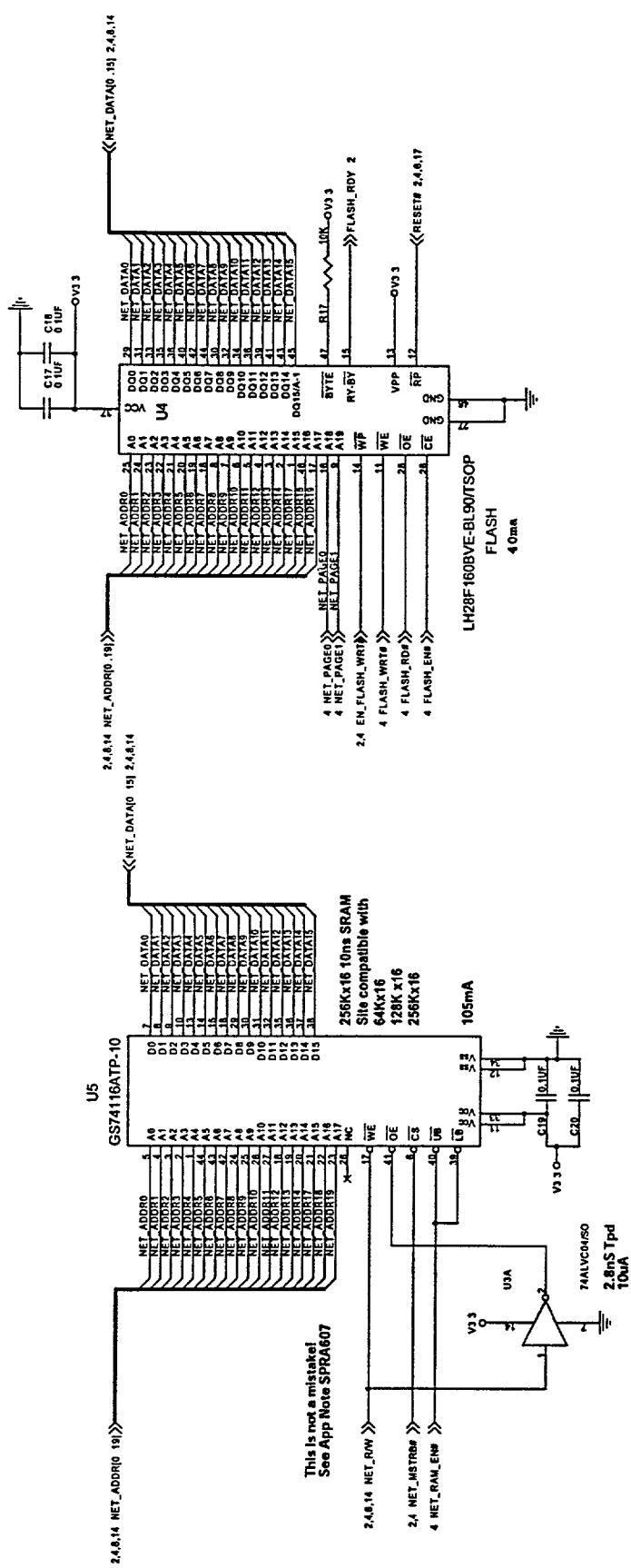
Figure 16:
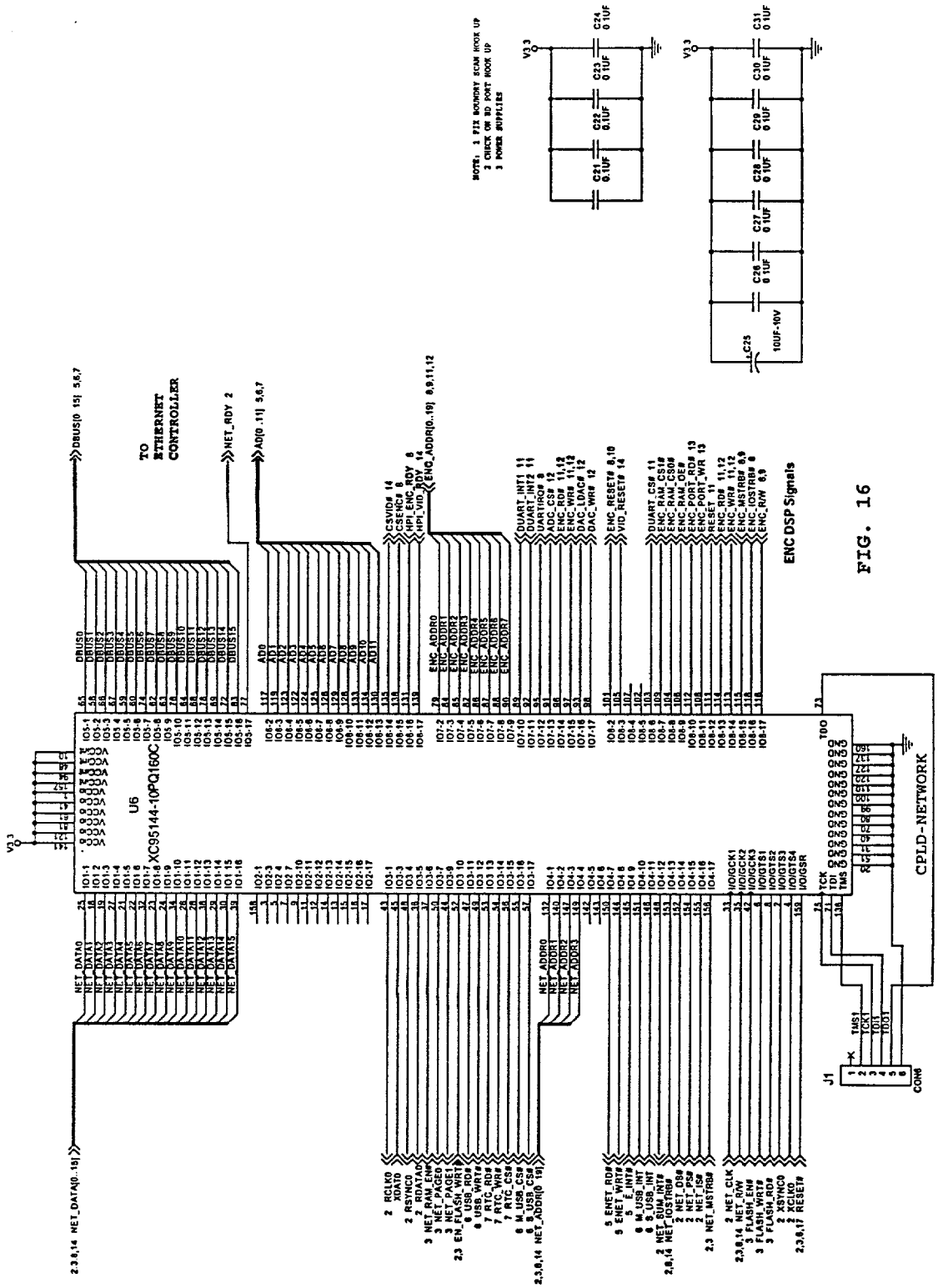
Figure 17:
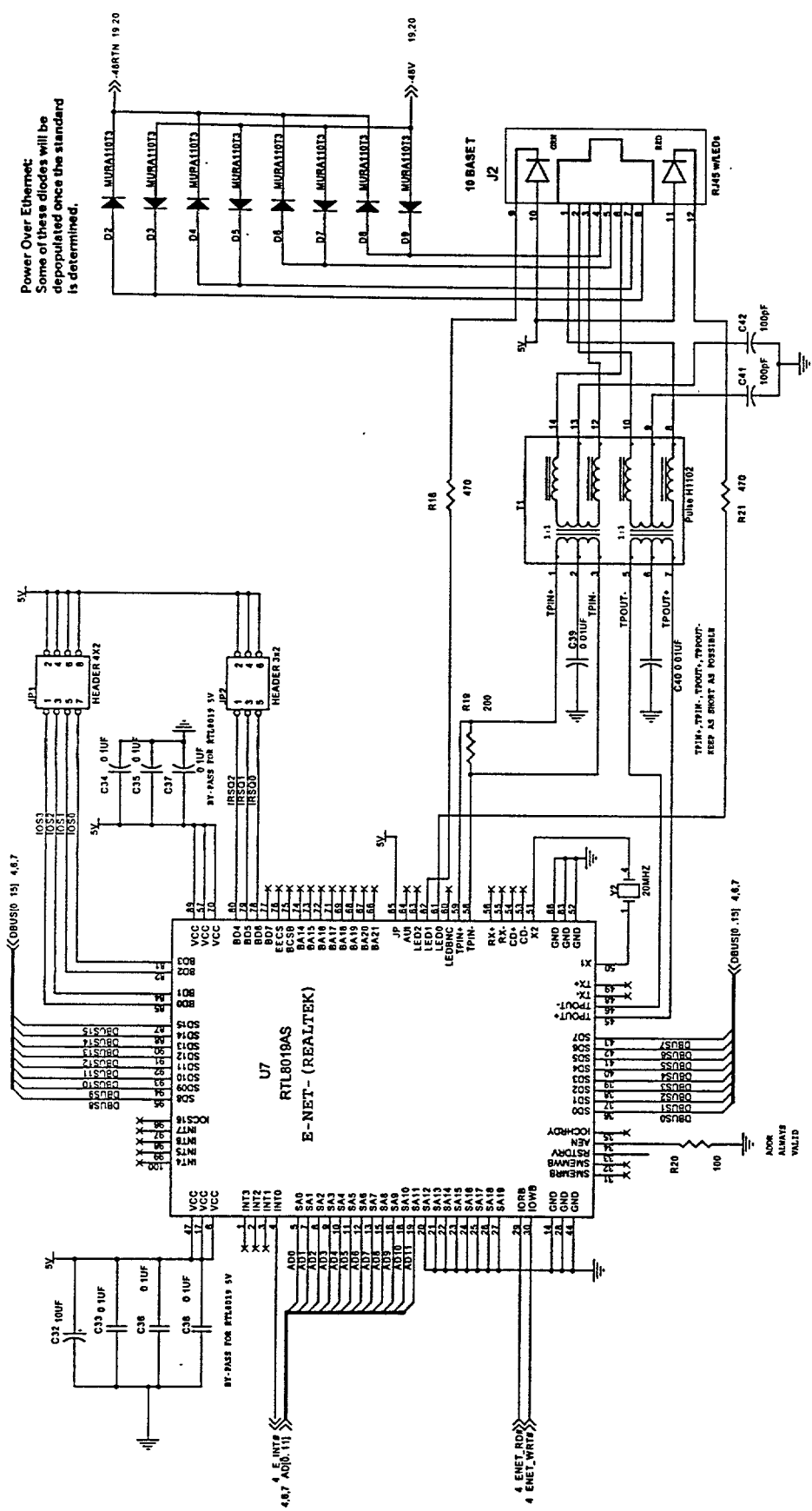
Figure 18:
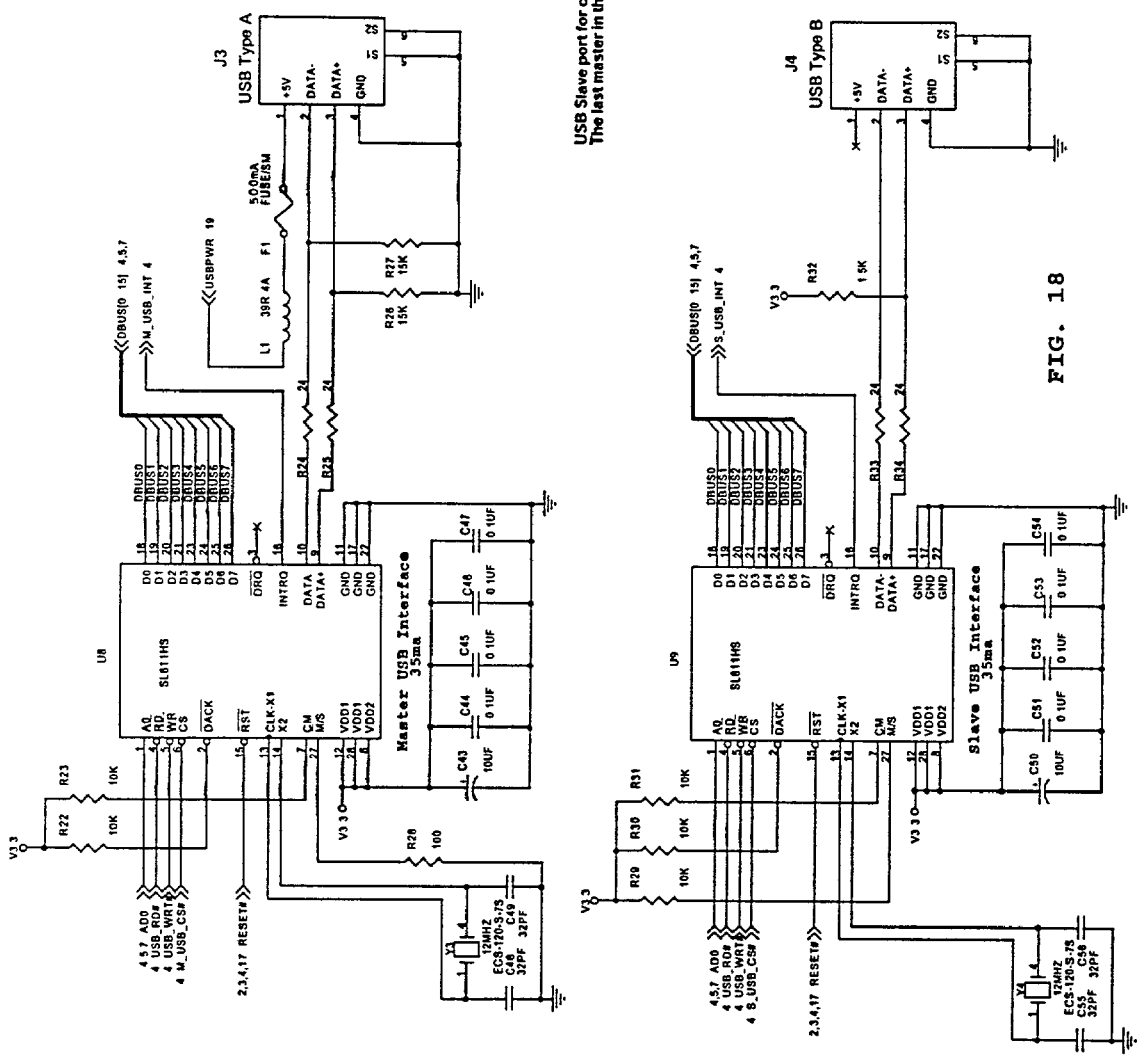
Figure 19:
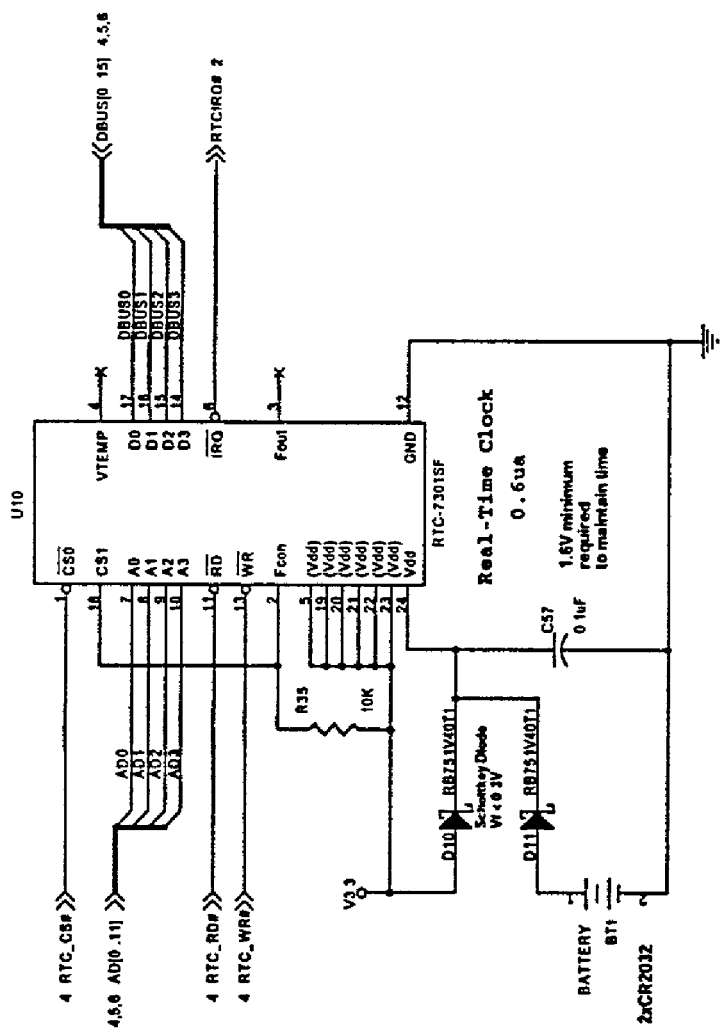
Figure 20:
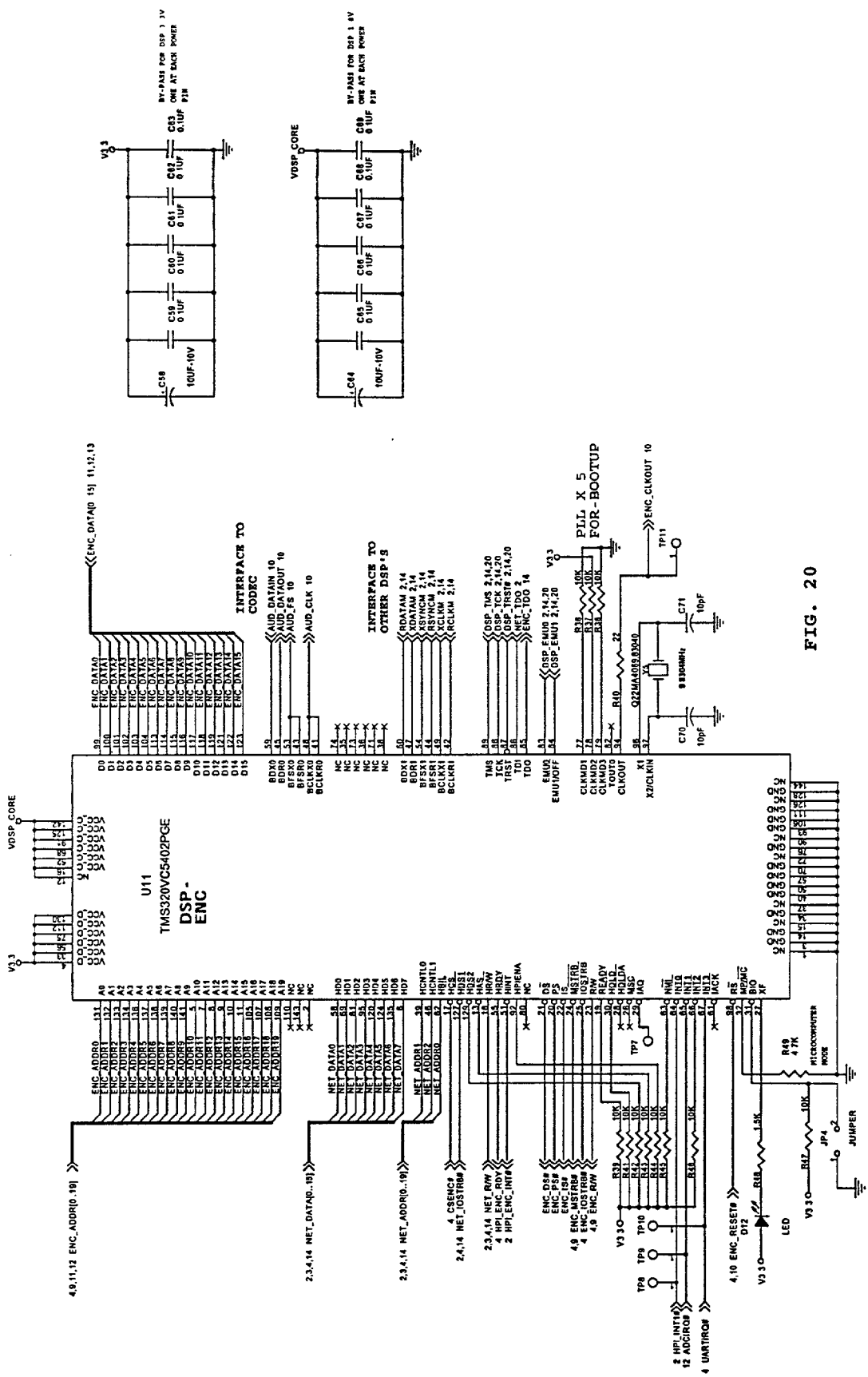
Figure 21:
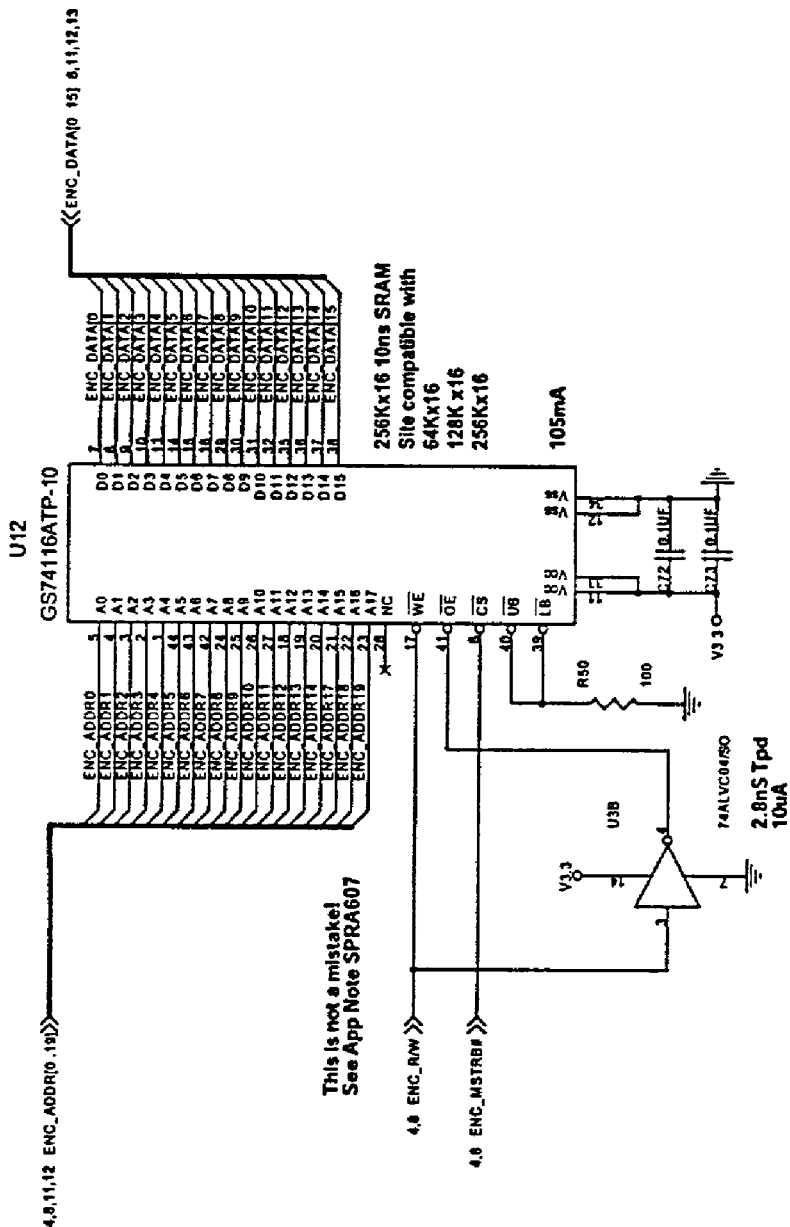
Figure 22:
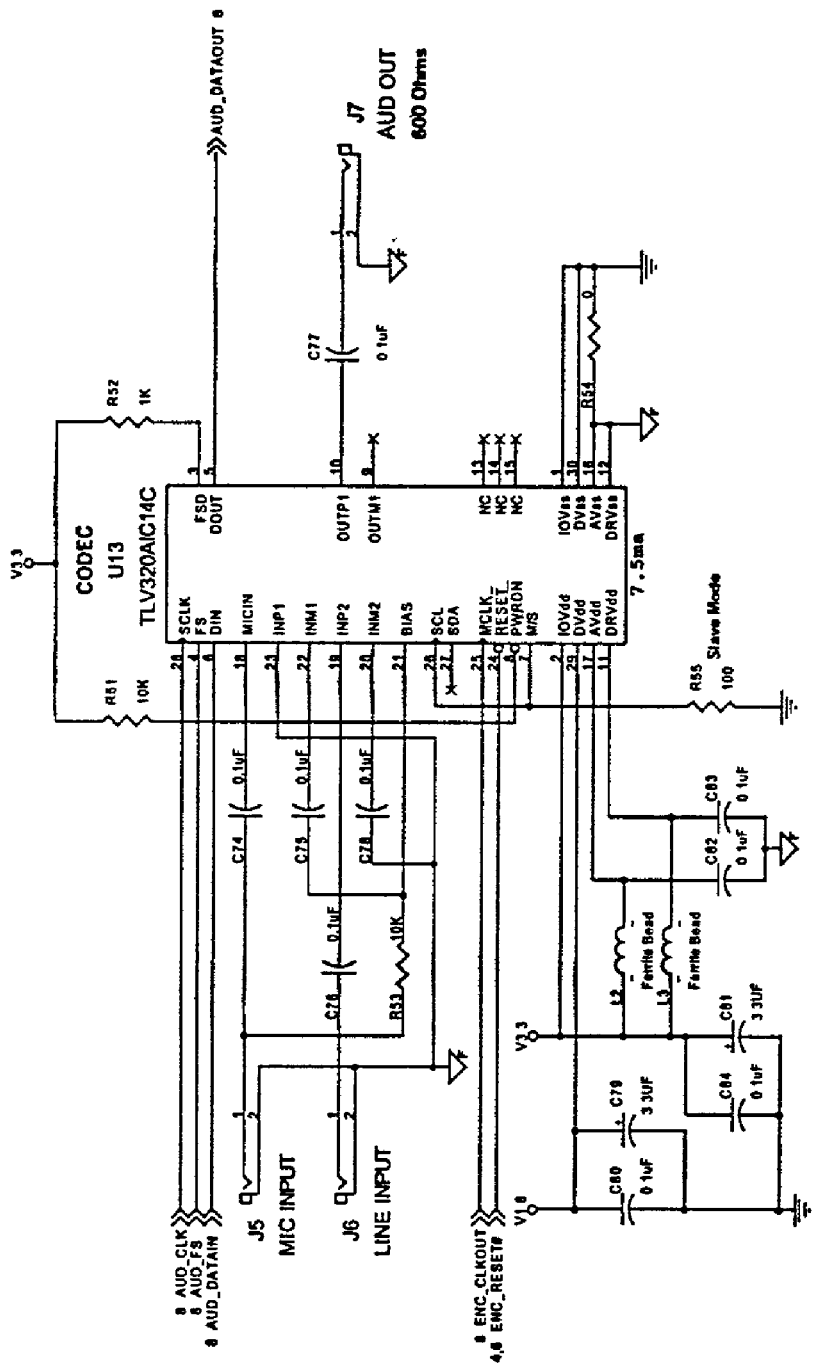
Figure 23:
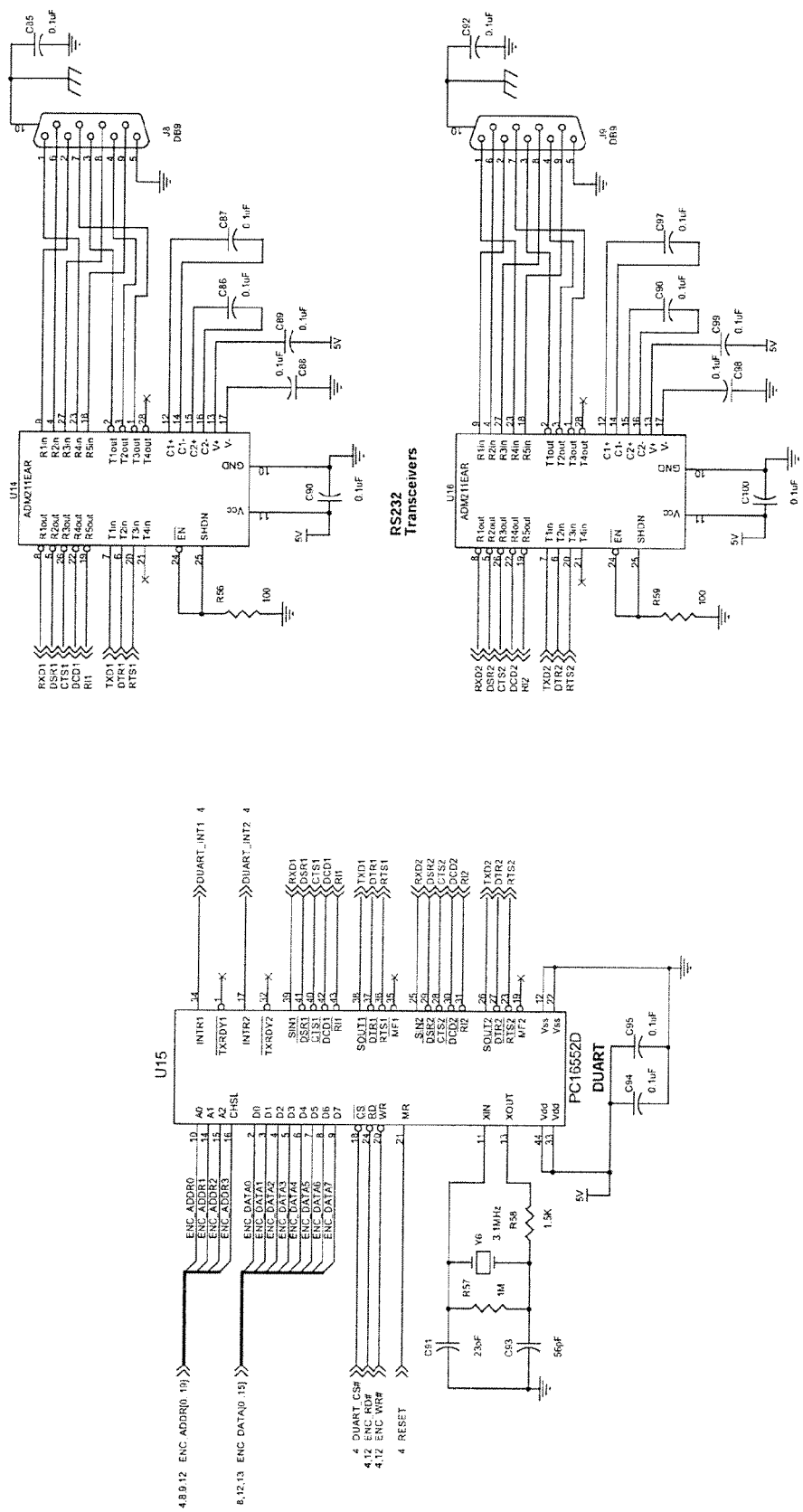
Figure 24:
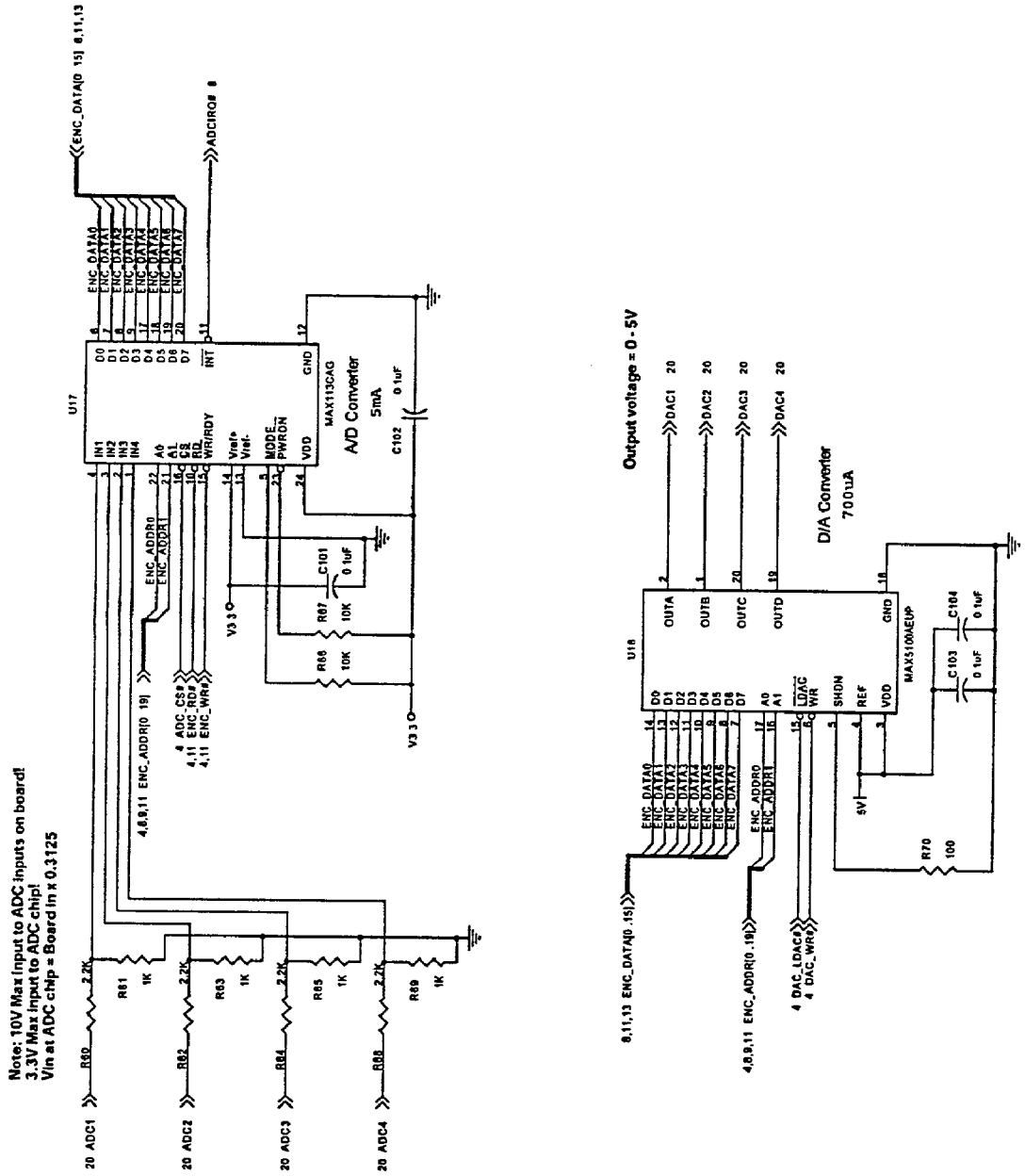
Figure 25:
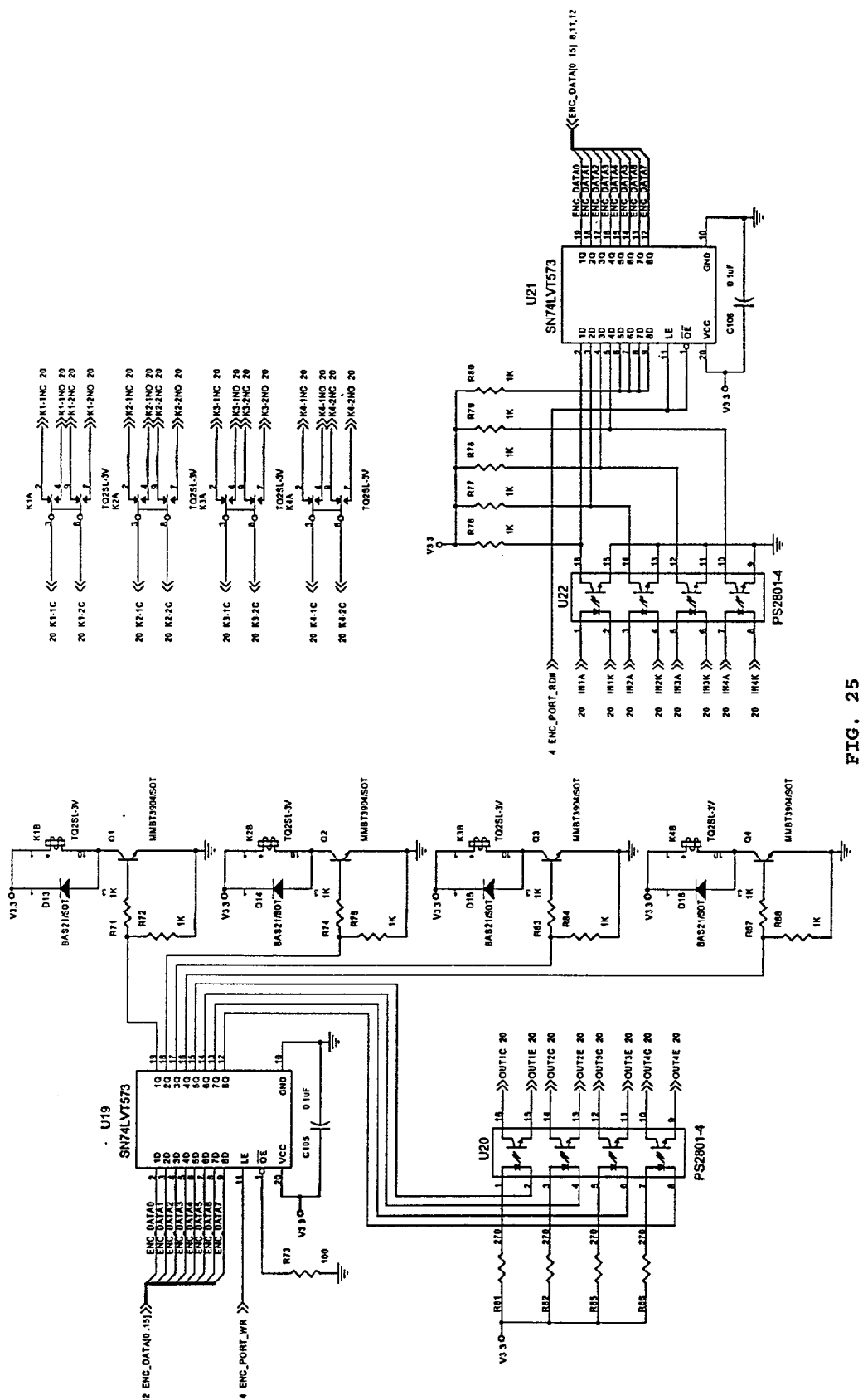
Figure 26:
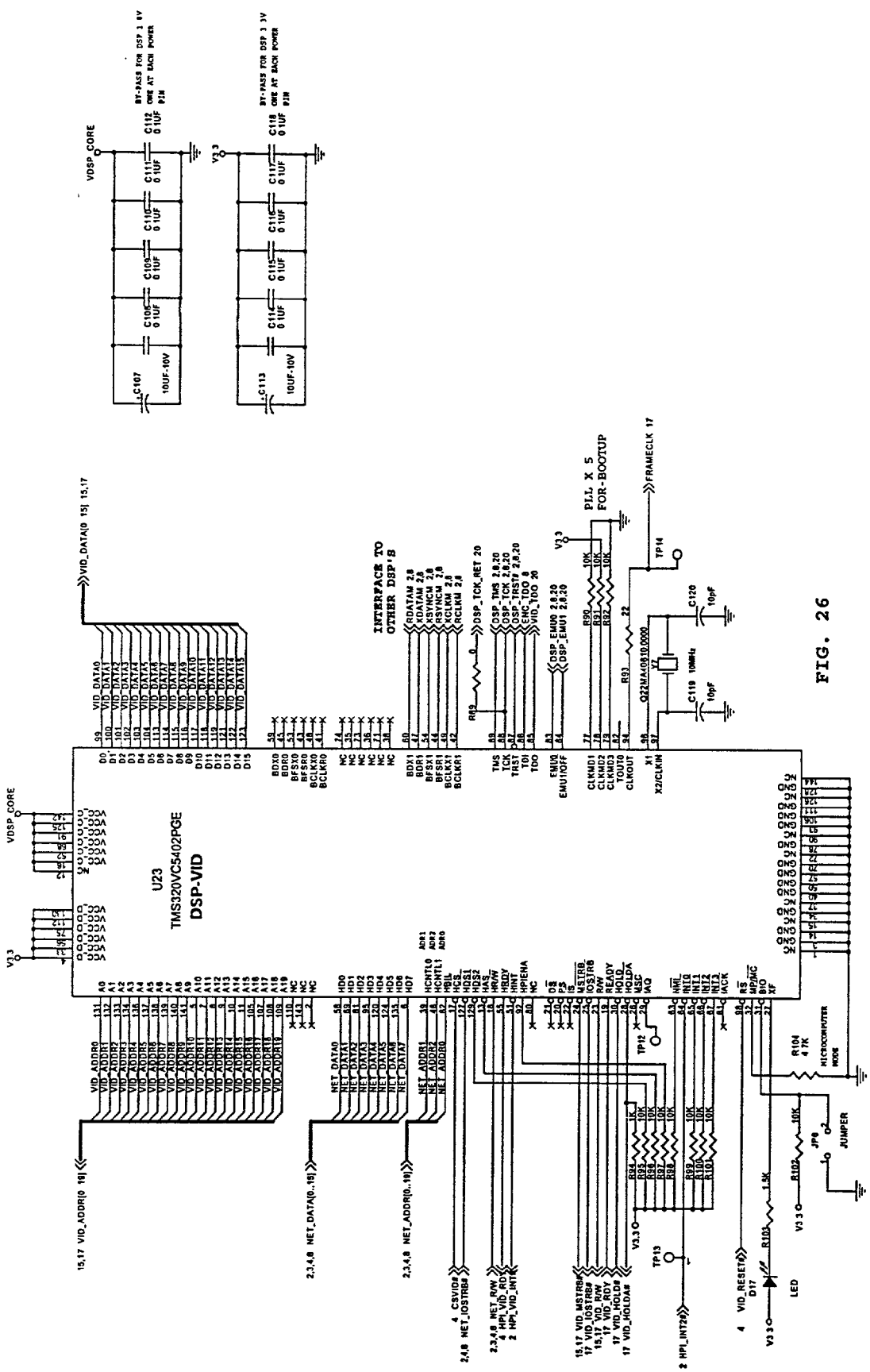
Figure 27:
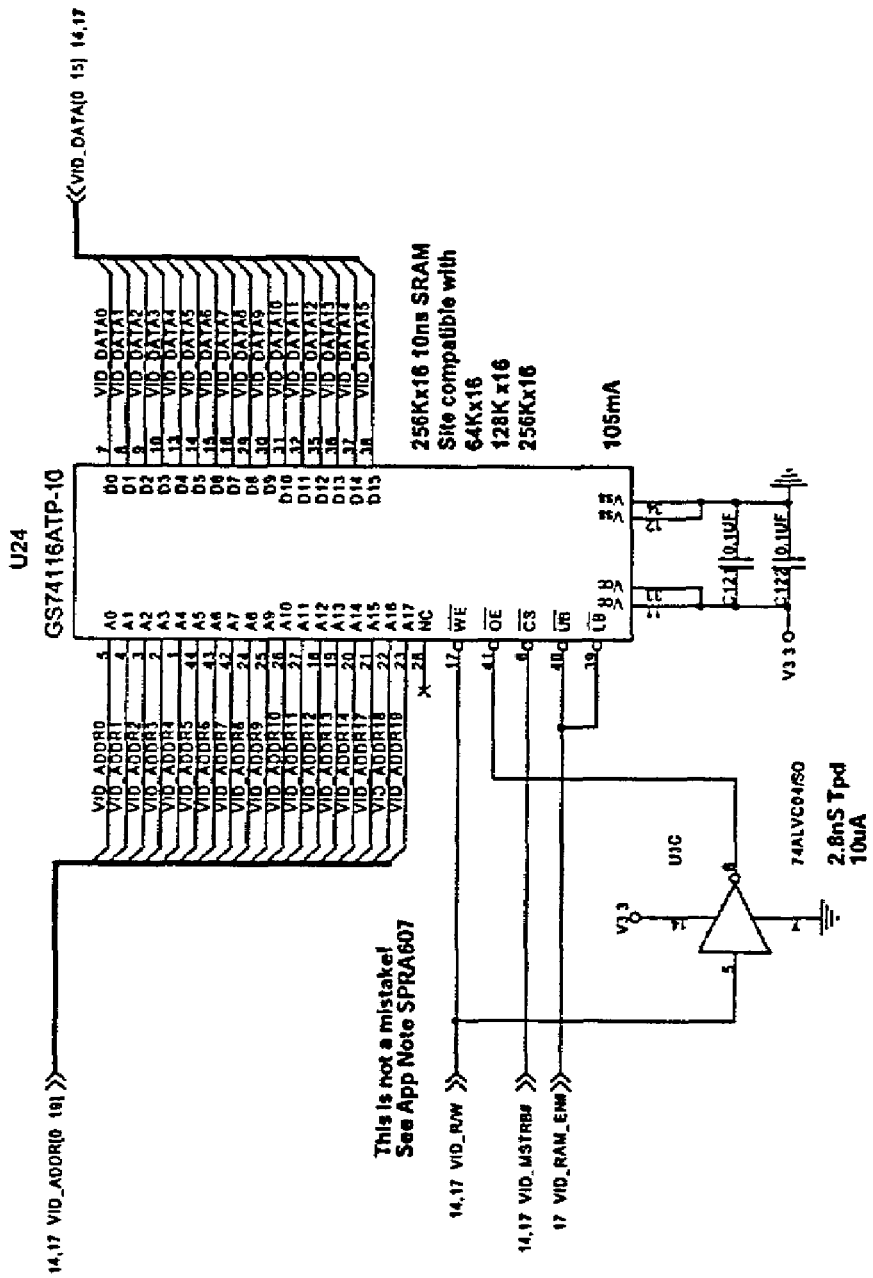
Figure 28:
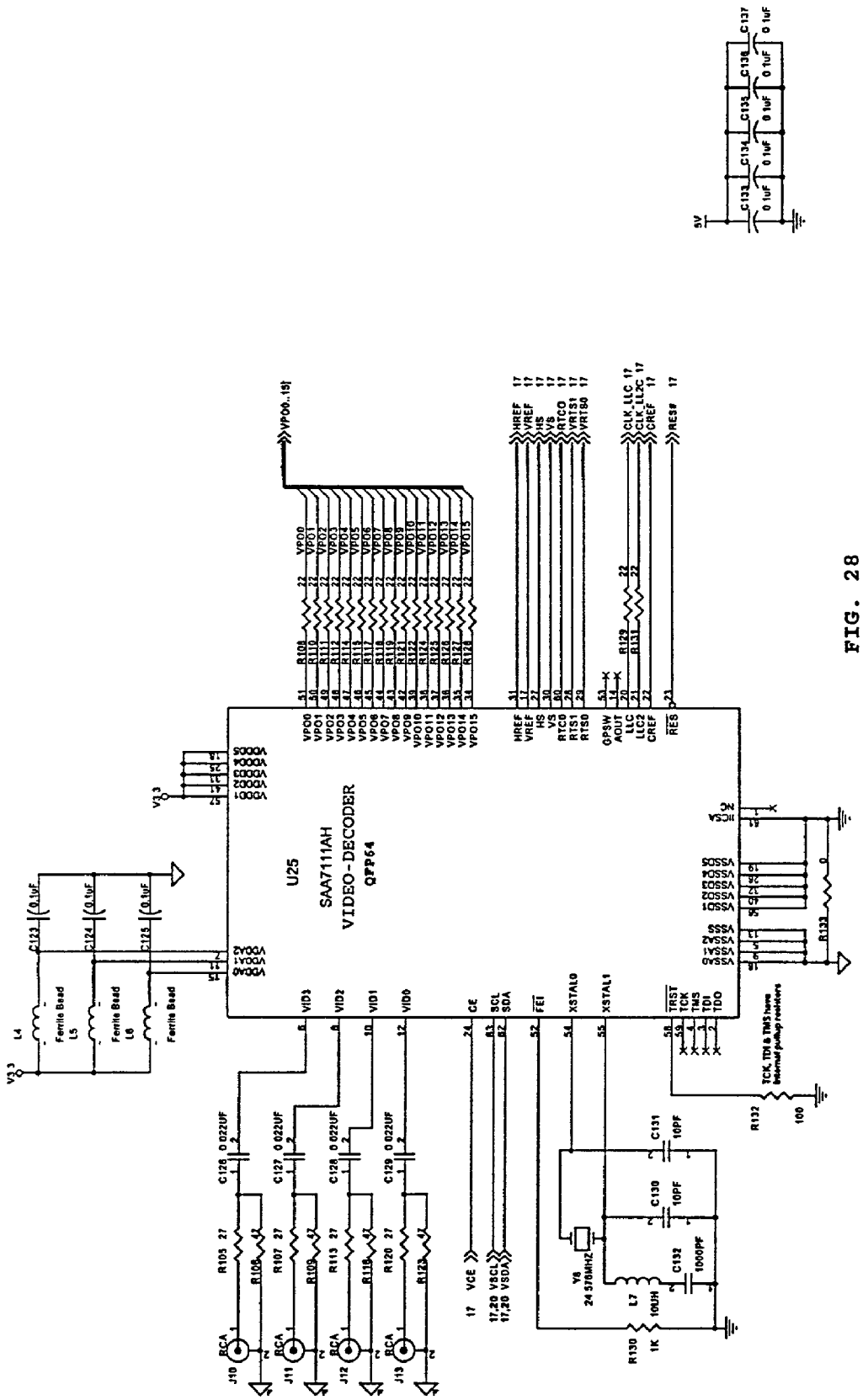
Figure 29:
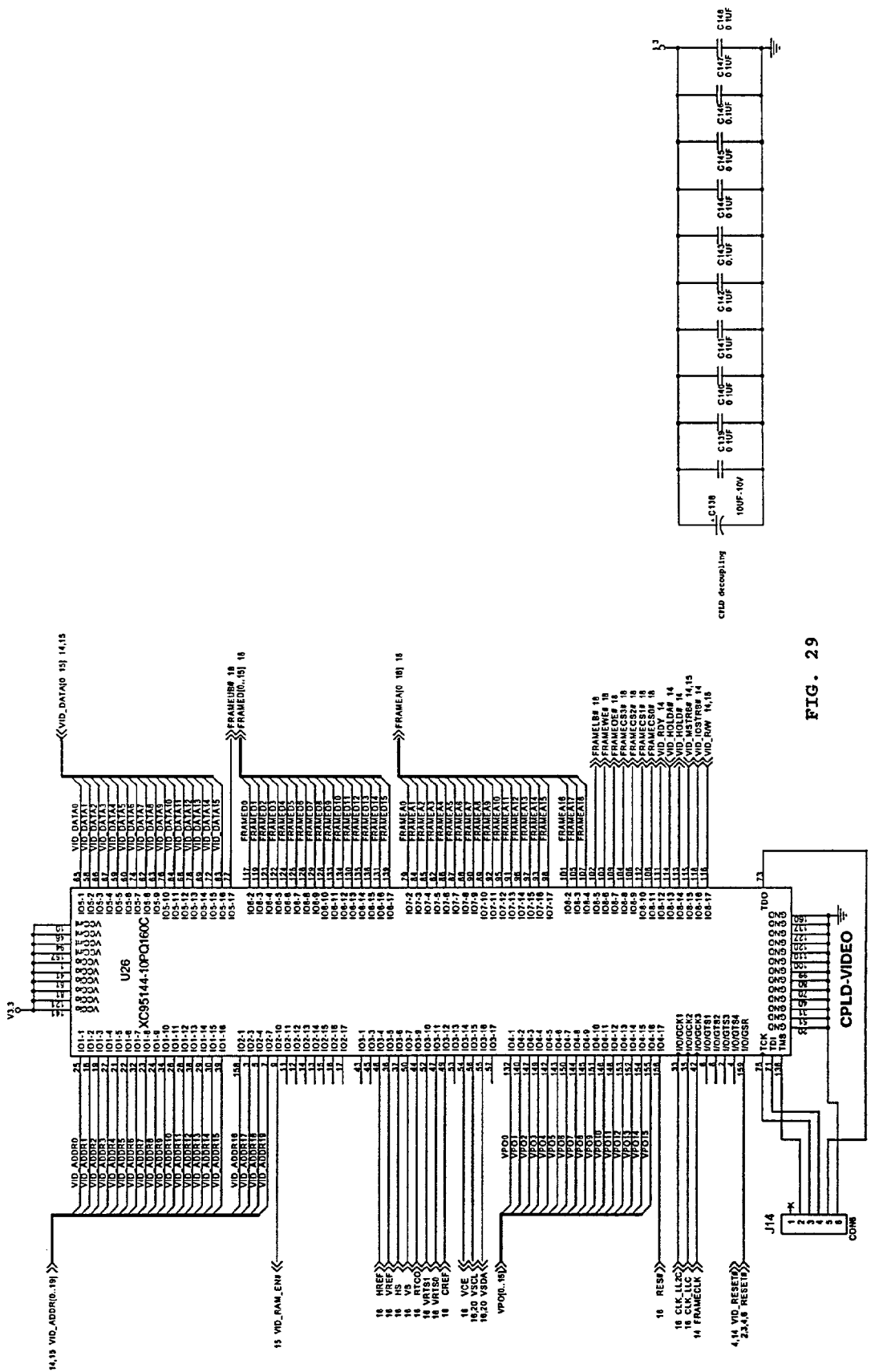
Figure 30:
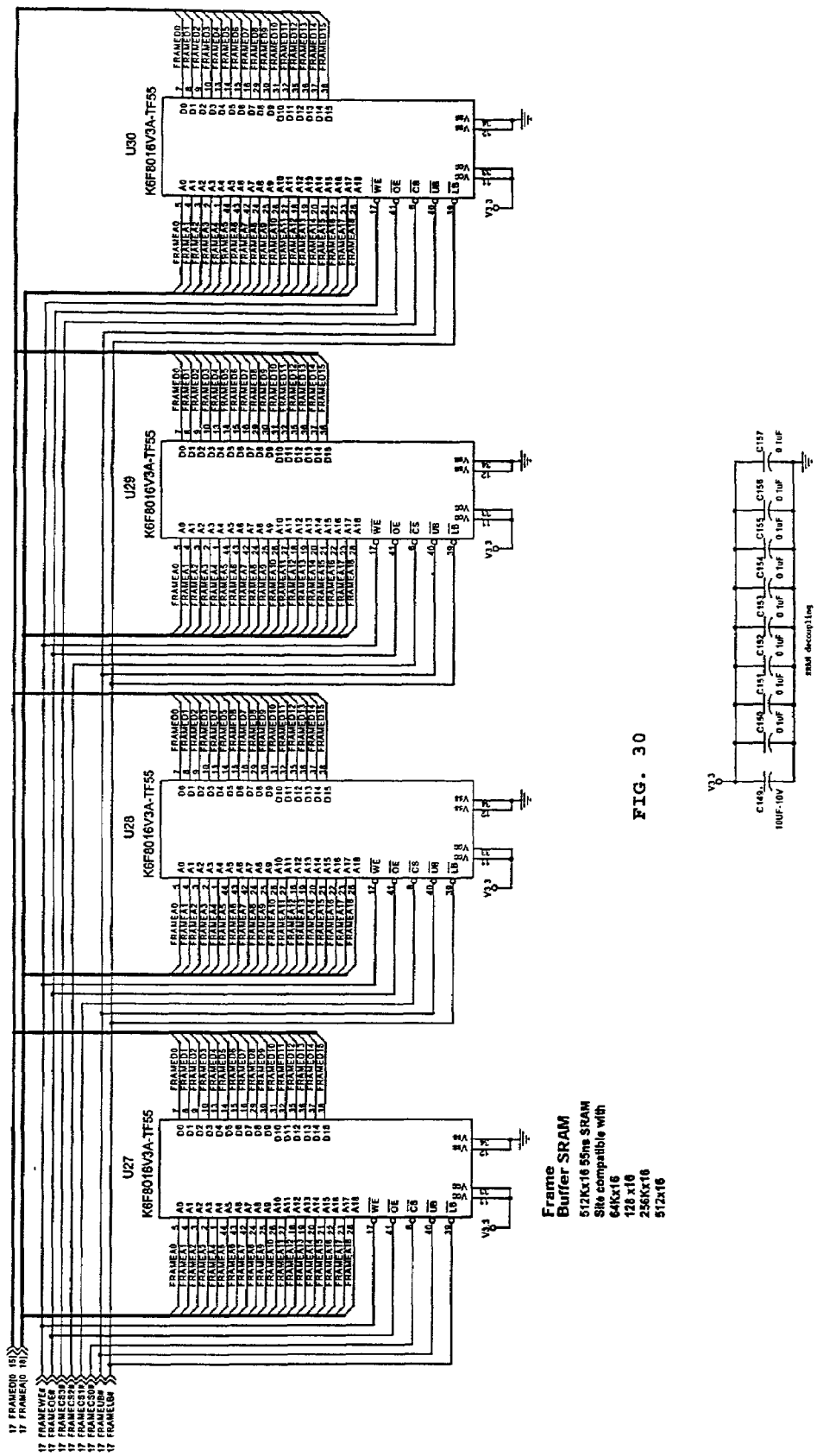
Figure 31:
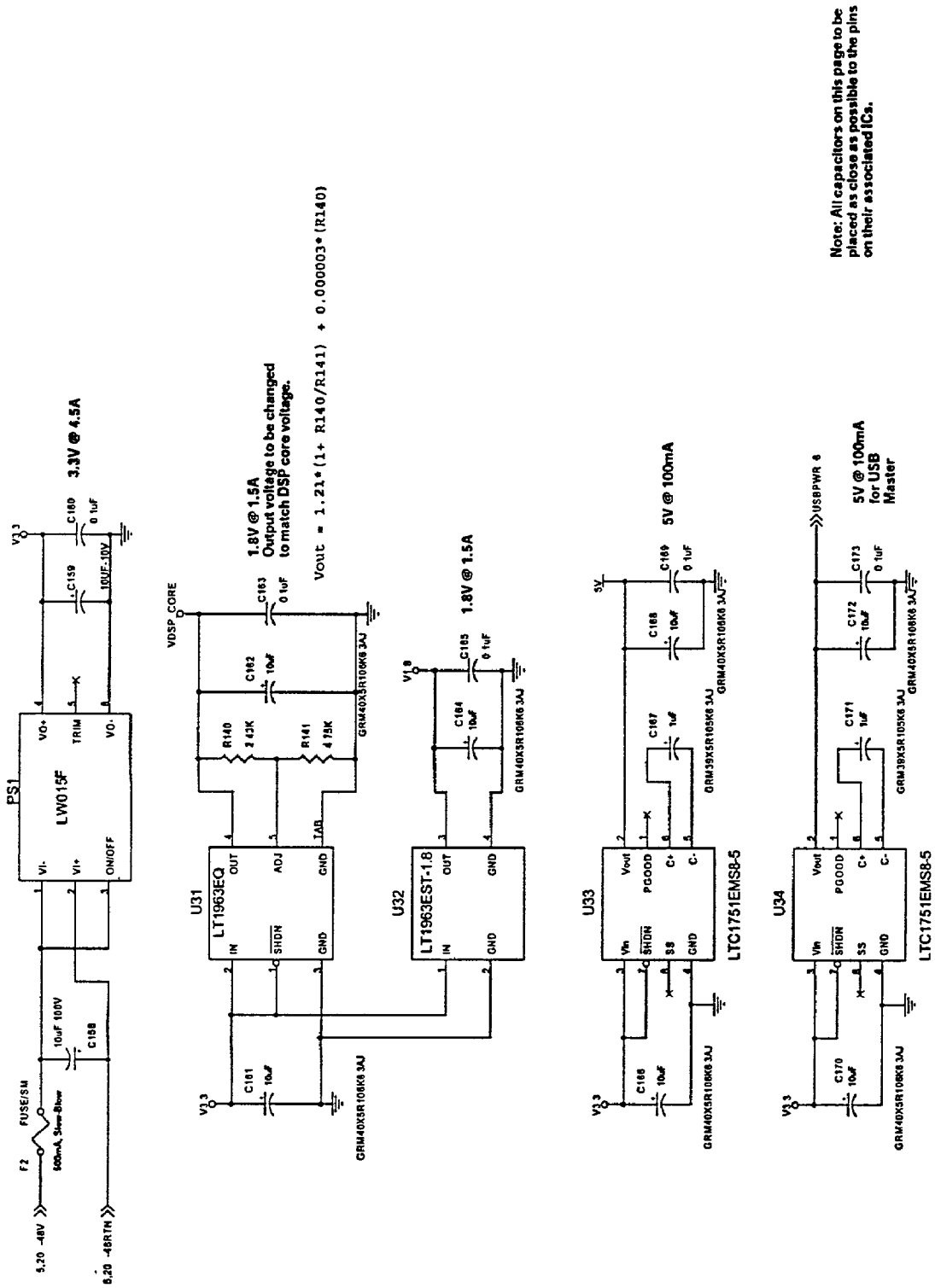
Figure 32:
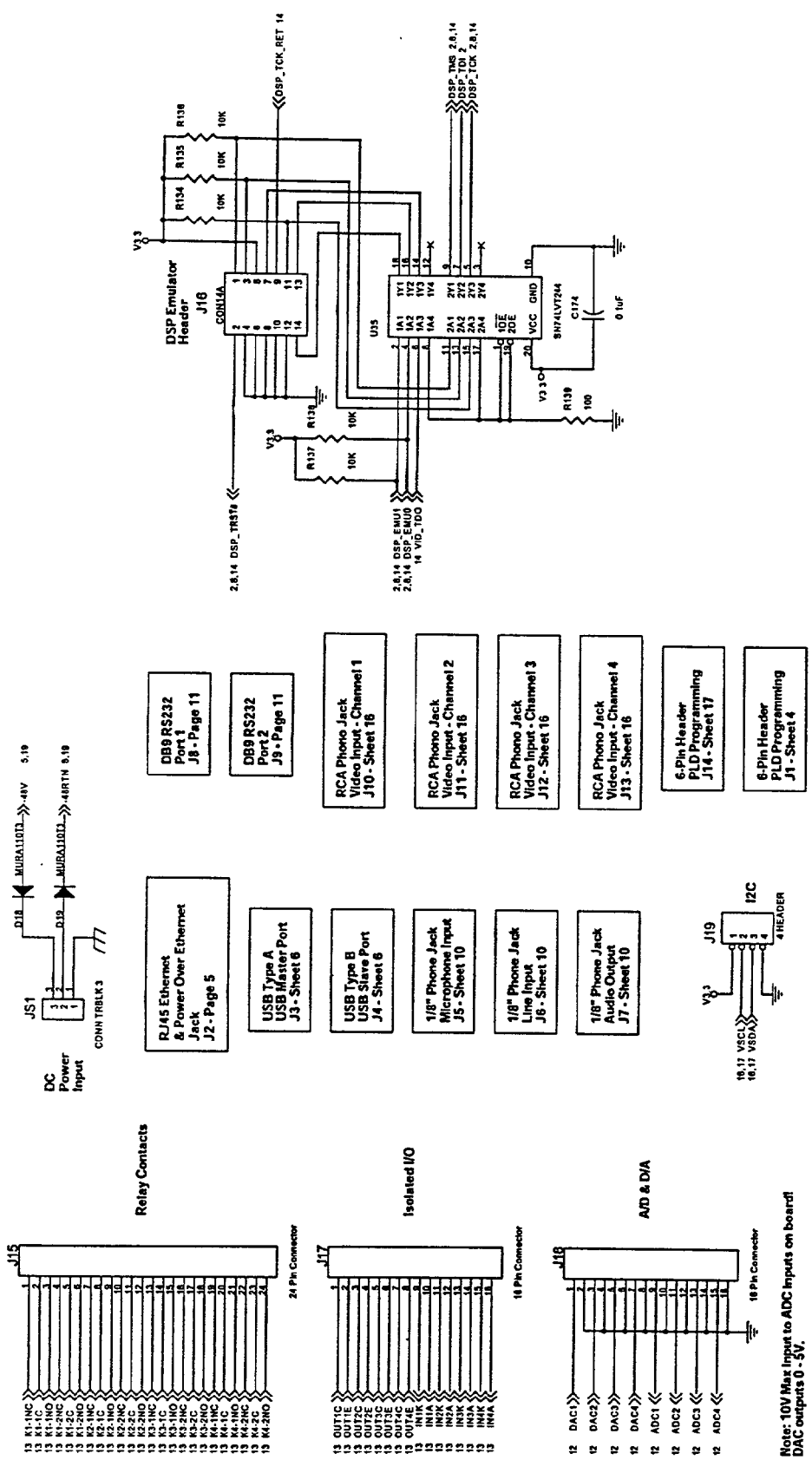
Figure 33:
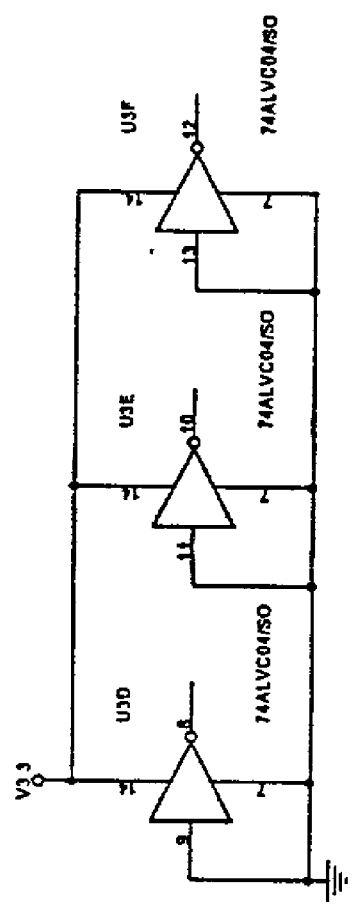

FIG. 12 is an exemplary flow diagram illustrating retrieval of a video frame. As discussed above, it is first necessary for a communication connection to be established between the network requestor and the analog gateway 20, 22. Thus, initially, the analog gateway 20, 22 waits for a request as indicated in step 132 (FIG. 4). Once a request is received, a determination is made whether the message received over the network was sent over a previously established secure communication channel. If the received message is not valid, no action is taken as indicated in step 228. If so, the received message is decrypted in step 230 which yields the unencrypted request, authentication information and possible request specific data. The unencrypted message is then analyzed for authentication in step 232. If the request is authenticated, the system checks in step 234 to determine whether the request is a valid request and, in other words, is permissible under the communication protocol being utilized. If so, the system checks in step 236 to determine the nature of the application specific request. In this example, it is assumed that the request is for a video frame. Once the request is decrypted and the system determines in step 232 whether the request contains a valid authentication, the encrypted video data is returned to the first processing element 21 or stored on a disk drives 48, 50 by way of the digital peripheral interface 92. Alternatively, if the digitized video data is stored in unencrypted format, it may be transferred directly to the first processing element 21, thereby avoiding encryption by the general purpose analog and audio processing element 78. After it is determined that the request is for a video frame in step 236, various processing is performed in step 238, 240 and 242. Initially, the analog video data from the camera 24, 26 is requested by the third processing element 25. The analog video data is converted to digital form by way of the video A/ID converted and passed on to the frame memory 110 and compressed by the processor 106 in step 240. The appropriate HTTP header and digital message format is constructed by the processor 106 in step 242 and passed on to the first processing element 23 in step 244 where the message is encrypted. Encrypted data is transferred to the first processing element 21 where it is transmitted to the network by way of the network interface 90 in step 246.

Obviously, many modifications and variations of the present invention are possible in light of the above teachings. Thus, it is to be understood that, within the scope of the appended claims, the invention may be practiced otherwise than as specifically described above.

What is claimed and desired to be covered by a Letters Patent is as follows.

We claim:

1. An analog gateway comprising:
    a plurality of processing elements connected in a pipelined architecture and configured to perform one or more tasks, each processing element including a processor connected to an inter-processor bus for enabling communication with at least one other processing element coupled to said inter-processor bus, wherein at least one of said plurality of processing elements includes a network interface for interfacing with a digital communication network and wherein at least one of said processing elements is configured to receive analog input signals and digitize said analog signals defining digitized signals and enable said digitized signals to be transmitted over said digital communication network, said plurality of processing elements forming an analog gateway; and
    an inter-processor bus connected to said plurality of processing elements.

2. The analog gateway as recited in claim 1, wherein each processing element includes a digital signal processor.

3. The analog gateway as recited in claim 1, wherein said analog gateway is configured with multiple modes of operation.

4. The analog gateway as recited in claim 3, wherein said multiple modes of operation includes a stand alone mode of operation in which said analog gateway is adapted to be coupled to an analog device and a local storage device and data from said analog device is stored in said local storage device.

5. The analog gateway as recited in claim 3, wherein said multiple modes of operation includes a network mode in which said analog gateway is connected to an analog device and a digital network and data from said analog device is transferred over said digital network.

6. The analog gateway as recited in claim 5, wherein said analog gateway is configured to enable devices connected to said digital network to communicate with an analog device connected to said analog gateway, thus establishing bi-directional communication therebetween.

7. The analog gateway as recited in claim 6, wherein said analog gateway is further configured to enable data stored in a local storage device to be retrieved over the network.

8. The analog gateway as recited in claim 1, wherein one or more of said of said processing elements is configured to encrypt data received over said inter-processor bus.

9. The analog gateway as recited in claim 1, wherein one of said processing elements is configured to decrypt encrypted messages received over said digital network.

10. The analog gateway as recited in claim 1, wherein one of said processing elements is configured to receive analog video data; digitize said video data; and compress said video data.

11. An analog gateway for interfacing analog devices with a digital communication network, the analog gateway comprising:
    a plurality of processing elements including a processor connected to an inter-processor bus for enabling each of said plurality of processing elements to communicate with at least one other processing element connected to said inter-processor bus, each processing element including sufficient memory for one or more predetermined tasks, wherein at least one of said processing elements includes a network interface for interfacing with a digital communication network and wherein at least one of said processing elements is configured to receive analog input signals and digitize said analog signals defining digitized signals and enable said digitized signals to be transmitted over said digital communication network, said plurality of processing elements forming an analog gateway configured to communicate with at least one other processing element connected to said inter-processor bus; and
    an inter-processor bus for enabling each of said processors to communicate with at least one other processing element forming a pipelined configuration.

12. The analog gateway as recited in claim 11, wherein one of said plurality of processing elements includes a digital signal processor.

13. The analog gateway as recited in claim 11, wherein one of said plurality of processing elements includes an analog interface for interfacing with an analog device.

14. The analog gateway as recited in claim 11, wherein said one of said plurality of processing elements is configured to enable bi-directional communication with said digital communication network.

15. The analog gateway as recited in claim 11, wherein one of said plurality of processing elements is configured to encrypt data before it is transferred over said digital communication network.

16. The analog gateway as recited in claim 15, wherein one of said plurality of processing elements is configured to decrypt messages from said digital communication network.

17. The analog gateway as recited in claim 11, wherein said processing elements are configured to be operable in multiple modes of operation.

18. The analog gateway as recited in claim 17, wherein said multiple modes includes a standalone mode in which data from any analog devices is adapted to be locally stored.

19. The analog gateway as recited in claim 17, wherein said multiple modes includes a network mode for communication with a said digital communication network.

* * * * *